(12) United States Patent
Terakawa

(10) Patent No.: US 7,537,262 B2
(45) Date of Patent: May 26, 2009

(54) RAIN AND SNOW PROTECTION DEVICE

(76) Inventor: Eitaro Terakawa, 66-25,
Murasakino-Shimomonzencho, Kita-ku,
Kyoto-shi, Kyoto 6038215 (JP)

( * ) Notice: Subject to any disclaimer, the term of this patent is extended or adjusted under 35 U.S.C. 154(b) by 0 days.

(21) Appl. No.: 12/069,673

(22) Filed: Feb. 12, 2008

(65) Prior Publication Data

US 2008/0169670 A1    Jul. 17, 2008

Related U.S. Application Data

(63) Continuation of application No. PCT/JP2006/315458, filed on Jul. 28, 2006.

(30) Foreign Application Priority Data

Dec. 19, 2005   (JP)   ............................. 2005-364253

(51) Int. Cl.
*B60J 1/00* (2006.01)
*B60S 1/54* (2006.01)
(52) U.S. Cl. ................. 296/96.15; 296/95.1; 296/96.14
(58) Field of Classification Search ................ 296/95.1, 296/96.15, 96.14, 84.1, 96.18
See application file for complete search history.

(56) References Cited

U.S. PATENT DOCUMENTS 5,097,563 A * 3/1992 Cowan ......................... 15/313

FOREIGN PATENT DOCUMENTS

| JP | 55-76728 | 6/1980 |
|---|---|---|
| JP | 58-14341 | 3/1983 |
| JP | 10-211869 | 8/1998 |
| JP | 2001-026258 | 1/2001 |
| JP | 2003-291786 | 10/2003 |

* cited by examiner

*Primary Examiner*—Glenn Dayoan
*Assistant Examiner*—Melissa A Black
(74) *Attorney, Agent, or Firm*—Day Pitney LLP

(57) ABSTRACT

The rain and snow protection device is constructed so that rain cannot adhere to the window glass in the range of the field of vision; thereby a satisfactory field of vision is continuously visible without the use of wipers, through the window glass from the driver's seat in the motor vehicle, for example. The window glass can be protected so that rain cannot adhere to it, by providing on the outside of the vehicle, on the window frame 2 of the vehicle in which the lighting material 1 is inserted, one transparent rain protection plate 11 or a plurality of transparent rain protection plates 11, 12, 13 that face the lighting material 1 and are provided with the respective spaces 17, 17 to form thereby the rain protection slits 18, 18 at the leading edges 15, 15 of the rain protection plates 11, 12, 13; either of the side edges 14, 14 of these rain protection plates 11, 12, 13 is joined to either of the side sections 5, 5 of the window frame 2, or is attached so that moving tilting motion is possible; furthermore, the air 47, 47, blown out from the air jet nozzles 8, 8 provided at one location or a plurality of locations inside the vehicle, passes through the respective spaces 17, 17 and is blown out from the rain protection slits 18, 18.

6 Claims, 15 Drawing Sheets

RAIN AND SNOW PROTECTION DEVICE

This application is a continuation of International Application PCT/JP2006/315458, file on Jul. 28, 2006 which in turn claims priority from Japanese Application No.: JP2005-364253.

TECHNICAL FIELD

The present invention relates to a rain and snow protection device that provides protection from rain and snow that adheres, for example, to the window glass on the driver's seat side of the vehicle and restricts the visibility range, so that a satisfactory field of vision can be continuously visible.

BACKGROUND TECHNOLOGY

Conventionally, the rain that adheres to the window glass, for example, on the driver's seat side of the vehicle, is removed by the action of the wipers. The wiper motion constitutes a back-and-forth motion that moves up and down or left and right in circular fashion. The clear field of vision with no adhering rain can only be seen intermittently. Moreover, at the time the wiper removes the rain, it crosses in front of the driver's eyes, and obstructs the view. The length of the wiper, in order to remove the rain adhering to the window glass, needs to be about ½ the length of the width of the window glass. The rain is also removed across the section of the field of vision that is not necessary for driving safety. The field of vision of the window glass is desirably wider in the sidewise direction, but in the up and down direction, it is adequate to guarantee a field of vision that is wide in the bottom section and rather wide in the top section, with the horizon as the center.

In Japanese Patent Publication No. 2003-291786, a nozzle is positioned in the bottom section of the windshield of the automobile, and rainwater is scattered by blowing compressed air on the face of the glass while this nozzle is moved up and down. However, the rod to which the nozzle is attached crosses the field of vision and scatters only the part of rainwater on which the compressed air is blown, so the range is narrow, and the field of vision cannot be continuously visible. In Japanese Patent Publication No. 2001-26258, the structure is such that the air taken in from the space between the hood and the engine housing of the vehicle is blown on the entire face of the glass from the jet nozzle provided on the front face of the windshield. However, only the rainfall and the water drops near the jet nozzle can be removed. In Japanese Patent Publication No. 10-211869, compressed air and wind pressure during vehicular motion are utilized, but with air from the position of attachment of this air wiper, snow and water drops cannot be removed from the entire face of the glass.

DISCLOSURE OF THE INVENTION

Problems to be Solved by the Invention

The rain and snow protection device blows away the rain so that the rain cannot adhere to the window glass (lighting material) in the visibility range from the driver's seat of the vehicle, and a satisfactory field of vision is thereby continuously visible without the use of wipers. The principles used here are that one sheet or a plurality of sheets of transparent glass (rain protection plates) facing the lighting material are provided on the outside of the vehicle with spaces between. Air having pressure stronger than the wind force exerted at the time of vehicular motion is blown out from the air jets provided inside the vehicle through the spaces in the transparent glass, and is blown continuously from the leading edge of the transparent glass toward the transparent glass and the window glass. The lengths of this transparent glass relative to the lighting material are shortened stepwise with increasing distance from the lighting material. Either of the side edges of this transparent glass is joined to either of the side sections of the window frame or can undergo sliding and/or moving motion. Furthermore, the air comprises, for example, air inside the vehicle, compressed air, exhaust gas from the engine of the vehicle, or exhaust gas from the hydrogen engine (hereinafter, termed air). The purpose is to provide, in this way, a rain and snow protection device whereby the vehicle can move during rainfall, while a satisfactory field of vision is continuously visible.

The present invention provides as its solution to the problems, protection from rain and snow that obstruct the field of vision by adhering to the window glass, for example, on the driver's seat side of the vehicle, so that a satisfactory field of vision can be continuously visible.

BEST WORKING MODE OF THE INVENTION

Therefore, according to first embodiment of the present invention, a rain and snow protection device, is constructed so that a plurality of transparent rain protection plates 11, 12, 13 are provided on the outside of the motor vehicle toward the lighting material 1, in the direction downwards from the top edge section 3, or upwards from the bottom edge section 4, of the window frame 2 of the motor vehicle, ship, or aircraft (hereinafter termed vehicle) in which the lighting material 1 is inserted, wherein the faces of the plurality of transparent rain protection plates 11, 12, 13 are provided therein with spaces 17, 17 facing the lighting material 1 to form by this means the rain protection slits 18, 18, at the leading edges 15, 15 of the aforementioned rain protection plates 11, 12, 13, wherein the lengths of the aforementioned rain protection plates 11, 12, 13 relative to the lighting material 1 are shortened stepwise with increasing distance from the lighting material 1, wherein either of the side edges 14, 14 of the aforementioned rain protection plates 11, 12, 13 is joined to either of the side sections 5, 5 of the window frame 2, furthermore, wherein air jet nozzles 8, 8 are provided at one location or a plurality of locations inside the vehicle, wherein the air 47, 47 blown out from these air jet nozzles 8, 8 passes through the aforementioned spaces 17, 17 and is blown out from the aforementioned rain protection slits 18, 18.

FIG. 1(a) is the figure showing the rain and snow protection device of the present invention 1, as one example of the working mode. Three transparent rain protection plates 11, 12, 13 are provided on the outside of the motor vehicle toward the lighting material 1, in the direction upwards from the bottom edge section 4 of the window frame 2 of the vehicle in which the lighting material 1 is inserted. The faces of the respective transparent rain protection plates 11, 12, 13 are provided therein with the respective spaces 17, 17, 17 facing the lighting material 1 to form by this means the rain protection slits 18, 18, 18 at the leading edges 15, 15, 15 of the rain protection plates 11, 12, 13. The lengths of the rain protection plates 11, 12, 13 relative to the lighting material 1 are shortened stepwise with increasing distance from the lighting material 1. Either of the side edges 14, 14 of the rain protection plates 11, 12, 13 is joined to either of the side sections 5, 5 of the window frame 2. Furthermore, the air jet nozzles 8, 8, 8 are provided at 3 locations inside the vehicle.

FIG. 1(b) is the cross-sectional view along the AA line in FIG. 1(a) of the present invention 1, and shows the principles of the rain and snow protection device. As shown by the arrows, when rain falls on the faces of the lighting material 1 and the rain protection plates 11, 12, 13, air, having strong enough wind force so that the rain cannot adhere on the faces of the lighting material 1 and rain protection plates 11, 12, 13, is blown out from the air jet nozzles 8, 8, 8 provided inside the vehicle. This air passes through the spaces 17, 17, 17 and is blown out from the rain protection slits 18, 18, 18 provided at the leading edges 15, 15, 15 of the rain protection plates 11, 12, 13. The rain is blown away by the strong force of the wind blown out towards the rear and towards the top, along the faces of the lighting material 1 and the rain protection plates 11, 12. There can be protection from the adherence of rain on the faces of the lighting material 1 and the rain protection plates 11, 12. The effects of the action are enhanced by the addition of the speed of motion of the vehicle to the high wind speed that blows upwards towards the rear and towards the top from inside the vehicle in high speed motion. Consequently, a satisfactory field of vision can be continuously visible through the parts of the lighting material 1 and the rain protection plates 11, 12, 13 where no rain has adhered.

The configurations of the rain protection plates 11, 12, 13 of the present invention 1 can have various forms to match the configuration of the face of the lighting material 1. The number of attached sheets of the rain protection plates 11, 12, 13 and the spaces of the rain protection slits 18 can be changed according to the size of the lighting material 1. The leading edges 15, 15, 15 of the rain protection plates 11, 12, 13 are not restricted to being linear in the horizontal direction. The configuration is satisfactory as long as a good field of vision is visible in the driver's line of sight. By treating both faces of the glass with a water-repellent process or a process preventing adhesion, the surface water on the lighting material 1 and the rain protection plates 11, 12, 13 is blown away more easily. Further, a nozzle for spraying liquid may be provided inside the vehicle. Water or wash liquid can be sprayed into the air passing through the inside of the spaces 17, 17 to wash the surfaces or the inside faces of the lighting material 1 and the rain protection plates 11, 12, 13. By heating the air that is blown out, the lighting material 1 and the rain protection plates 11, 12, 13 are heated. The water can be evaporated more easily. It is also possible to provide a wire member for use as heating wire in the lighting material 1 and the rain protection plates 11, 12, 13. When air is not being blown out from the air jet nozzles 8, 8, the opening of the rain protection slit 18 faces upwards so there is incursion of rain and snow into the space 17. However, by providing a drain hole inside the vehicle that can optionally open and close, the water can be drained out. The materials for these rain protection plates 11, 12, 13 comprise transparent materials such as glass and plastic that are identical to those for the lighting material 1.

FIG. 2(*a*) is the figure showing the rain and snow protection device of the present invention 1, attached to the window frame at the rear of the vehicle, as one example of the working mode. Two transparent rain protection plates 11, 12 are provided on the outside of the vehicle toward the lighting material 1, in the direction downwards from the top edge section 3 of the rear window frame 2 of the vehicle in which the lighting material 1 is inserted. The faces of the respective transparent rain protection plates 11, 12 are provided therein with the respective spaces 17, 17 facing the lighting material 1 to form by this means the rain protection slits 18, 18 at the leading edges 15, 15 of the rain protection plates 11, 12. The lengths of the rain protection plates 11, 12 relative to the lighting material 1 are shortened stepwise with increasing distance from the lighting material 1. Either of the side edges 14, 14 of the rain protection plates 11, 12 is joined to either of the side sections 5, 5 of the window frame 2. Furthermore, air jet nozzles 8, 8 are provided at 2 locations inside the roof.

FIG. 2(*b*) is the cross-sectional view along the BB line in FIG. 2(*a*) of the present invention 1, and shows the principles of the rain and snow protection device. When rain falls on the faces of the lighting material 1 and the rain protection plates 11, 12, as shown by the arrows, air having strong enough wind force so that the rain cannot adhere on the faces of the lighting material 1 and rain protection plate 11, is blown out from the air jet nozzles 8, 8 provided inside the roof of the vehicle. This air passes through the spaces 17, 17 and is blown out from the rain protection slits 18, 18 provided at the leading edges 15, 15 of the rain protection plates 11, 12. The rain is blown away by the strong force of the wind blown out towards the rear and towards the bottom, along the faces of the lighting material 1 and the rain protection plate 11. There can be protection from the adherence of rain on the faces of the lighting material 1 and the rain protection plate 11. Consequently, the driver can have a line of sight through the rear window, of a satisfactory rear field of vision continuously visible through the parts of the lighting material 1 and the rain protection plate 11 where no rain had adhered. The rain protection plates 11, 12, 13 are attached facing downwards. The rain protection slit 18 has its opening facing downwards. Therefore, the structure is such that incursion of rain, snow, dust, etc. into the space 17 occurs with difficulty when air is not being blown out from the air jet nozzles 8, 8.

FIG. 3(*a*) is the figure showing the rain and snow protection device of a variation of the present invention 1, as one example of the working mode. Three transparent rain protection plates 11, 12, 13 are provided on the outside of the vehicle toward the lighting material 1, in the direction downwards from the top edge section 3 of the window frame 2 of the vehicle in which the window frame 2 is attached almost vertically. The faces of the respective transparent rain protection plates 11, 12, 13 are provided therein with the respective spaces 17, 17, 17 facing the lighting material 1 to form by this means the rain protection slits 18, 18, 18. The lengths of the rain protection plates 11, 12, 13 relative to the lighting material 1 are shortened stepwise with increasing distance from the lighting material 1. Either of the side edges 14, 14 of the rain protection plates 11, 12, 13 are joined to either of the side sections 5, 5 of the window frame 2. Furthermore, the air jet nozzles 8, 8, 8 are provided at 3 locations in the roof. The rain protection plates 11, 12, 13 are attached facing downwards and the rain protection slit 18 has its opening facing downwards. Therefore, the structure is such that incursion of rain, snow, dust, etc. into the space 17 occurs with difficulty when air is not being blown out from the air jet nozzles 8, 8.

FIG. 3(*b*) is the cross-sectional view along the CC line in FIG. 3(*a*) of the present invention 1, and shows the principles of the variation of the rain and snow protection device. When rain falls on the faces of the lighting material 1 and the rain protection plates 11, 12, 13, as shown by the arrows, air having strong enough wind force so that the rain cannot adhere on the faces of the lighting material 1 and rain protection plates 11, 12 is blown out from the air jet nozzles 8, 8, 8 provided inside the roof. This air passes through the spaces 17, 17, 17 and is blown out from the rain protection slits 18, 18, 18 provided at the leading edges 15, 15, 15 of the rain protection plates 11, 12, 13. The rain is blown away by the strong force of the wind blown out downwards along the faces of the lighting material 1 and the rain protection plates 11, 12. There can be protection from the adherence of rain on the faces of the lighting material 1 and the rain protection plates 11, 12. Consequently, the driver can have a line of sight of a satisfactory field of vision, continuously visible through the parts of the lighting material 1 and the rain protection plates 11, 12 where no rain has adhered. The rain and snow protection device of the present invention 1 is suitable for buses, trucks, streetcars, ships, for example, where the lighting material 1 of window frame 2 of the vehicle is attached almost vertically.

FIG. 4(*a*) is the figure showing a variation of the rain and snow protection device of the present invention 1, as one example of the working mode. Three transparent rain protection plates 11, 12, 13 are provided on the outside of the vehicle toward the lighting material 1, in the direction upwards from the bottom edge section 4 of the window frame 2 of the vehicle in which the window frame 2 is attached almost vertically. The faces of the respective transparent rain protection plates 11, 12, 13 are provided therein with the respective spaces 17, 17, 17 facing the lighting material 1 to form by this means the rain protection slits 18, 18, 18. The lengths of the rain protection plates 11, 12, 13 relative to the lighting material 1 are shortened stepwise with increasing distance from the lighting material 1. Either of the side edges 14, 14 of the rain protection plates 11, 12, 13 are joined to either of the side sections 5, 5 of the window frame 2. Furthermore, the air jet nozzles 8, 8, 8 are provided at 3 locations inside the vehicle.

FIG. 4(*b*) is the cross-sectional view along the DD line in FIG. 4(*a*) of the present invention 1, and shows the principles of the variation of the rain and snow protection device. When rain falls on the faces of the lighting material 1 and the rain protection plates 11, 12, 13, as shown by the arrows, air having strong enough wind force so that the rain cannot adhere on the faces of the lighting material 1 and the rain protection plates 11, 12 is blown out from the air jet nozzles 8, 8, 8 provided inside the vehicle. This air passes through the spaces 17, 17, 17 and is blown out from the rain protection slits 18, 18, 18 provided at the leading edges 15, 15, 15 of the rain protection plates 11, 12, 13. The rain is blown away by the strong force of the wind blown out upwards along the faces of the lighting material 1 and the rain protection plates 11, 12. There can be protection from the adherence of rain on the faces of the lighting material 1 and the rain protection plates 11, 12. Consequently, the driver can have a line of sight 7 of a satisfactory field of vision, continuously visible through the parts of the lighting material 1 and the rain protection plates 11, 12 where no rain has adhered.

The rain and snow protection device, described in Claim 2 of this invention (hereinafter termed the present invention 2), is characterized as being constructed so that on the outside of the vehicle, on either of the side sections 5, 5 of the window frame 2 of the vehicle in which the lighting material 1 is inserted, one of the respective long frame members 19, 19, extending upwards toward the inside of the roof or downwards toward the inside of the vehicle from either of the side sections 5, 5, is attached. The transparent wind protection plate 20 is inserted in these respective frame members 19, 19 so that sliding motion is possible. The aforementioned window frame 2 can be sealed by means of this transparent wind protection plate 20.

FIG. 5(*a*) is the figure showing the rain and snow protection device of the present invention 2, as one example of the working mode. On the outside of the vehicle, on either of the side sections 5, 5 of the window frame 2 of the vehicle in which the lighting material 1 is inserted, one of the respective long frame members 19, 19, extending downwards toward the inside of the vehicle from either of the side sections 5, 5, is attached. The transparent wind protection plate 20 is inserted in these respective frame members 19, 19 so that sliding motion is possible. The window frame 2 can be sealed by means of this wind protection plate 20.

FIG. 5(*b*) is the cross-sectional view along the EE line in FIG. 5(*a*) of the present invention 2, and shows that when air is not being blown out from the air jet nozzles 8, 8, the window frame is sealed with the wind protection plate 20 to prevent incursion by rain, snow, and dust. By sealing the top of the rain protection plates 11, 12, 13 with the wind protection plate 20 when it is not raining, the air resistance can be reduced when the vehicle is in motion. FIG. 5(*c*) is the figure of the sliding device 41 of the present invention 2, as one example of the working mode. The rack gear 45 attached to either of the side sections meshes with the gear 44. The wind protection plate 20 slides by means of this gear 44 by the rotation of the motor 46. The entire face of the rain protection plates 11, 12, 13 can be sealed or be opened completely.

The rain and snow protection device, described in claim 3 of this invention (hereinafter termed the present invention 3), is characterized as being constructed so that in a rain and snow protection device wherein one transparent rain protection plate (11) or a plurality of transparent rain protection plates (11, 12, 13) are provided on the outside of the vehicle toward the lighting material (1), in the direction downwards from the top edge section (3) or upwards from the bottom edge section (4) of the window frame (2) of the vehicle in which the lighting material (1) is inserted, wherein the faces of the aforementioned rain protection plates (11, 12, 13) are provided therein with spaces (17, 17) facing the lighting material (1) to form by this means the rain protection slits (18, 18) at the leading edges (15, 15) of the aforementioned rain protection plates (11, 12, 13), wherein the lengths of the aforementioned rain protection plates (11, 12, 13) relative to the lighting material (1) are shortened stepwise with increasing distance from the lighting material (1), wherein either of the side edges (14, 14) of the aforementioned rain protection plates (11, 12, 13) is not joined to but is in contact with either of the side sections (5, 5) of the window frame (2). The edges on one side of the aforementioned rain protection plates 11, 12, 13 extend inside the vehicle from the top edge 9 or the bottom edge 10 of the aforementioned window frame 2. The edges on one side of the aforementioned rain protection plates 11, 12, 13 are connected to one or a plurality of moving devices 21, 21 provided inside the vehicle. The aforementioned moving devices 21, 21 are positioned by design to form rain protection slits 18, 18 at the leading edges 15, 15 of the aforementioned rain protection plates 11, 12, 13. The air 47, 47 blown out from the air jet nozzles 8, 8 provided at one location or a plurality of locations inside the vehicle passes through the aforementioned spaces 17, 17 and is blown out from the aforementioned rain protection slits 18, 18. The aforementioned rain protection slits 18, 18 can be sealed by operating the aforementioned moving devices 21, 21 to move the aforementioned rain protection plates 11, 12, 13 closer to the lighting material 1 and the adjacent rain protection plates 11, 12, 13 to narrow the aforementioned spaces 17, 17, and thereby have the faces or the leading edges 15, 15 of the aforementioned rain protection plates 11, 12, 13 adhere tightly to the faces of the lighting material 1 and the neighboring rain protection plates 11, 12, 13.

FIG. 6(*a*) is the figure showing the rain and snow protection device of the present invention 3, as one example of the working mode. Either of the side edges 14, 14 of the aforementioned rain protection plates 11, 12, 13 of the present invention 3 is not joined to but is in contact with either of the side sections 5, 5 of the window frame 2. The edges on one side of the respective rain protection plates 11, 12, 13 extend inside the vehicle upwards from the bottom edge of the window frame 2. These respective edges on one side are connected to the moving devices 21, 21 provided inside the vehicle, and positioned by design to form the rain protection slits 18, 18, 18 at the leading edges 15, 15, 15 of the rain protection plates 11, 12, 13. The air jet nozzles 8, 8, 8 are provided at 3 locations inside the vehicle, and can emit strong air jets. The rain protection slits 18, 18, 18 can be sealed by operating these moving devices 21, 21 to move the rain protection plates 11, 12, 13 closer to the lighting material 1 and the adjacent rain protection plates 11, 12 to narrow the spaces 17, 17, 17. The faces or the leading edges 15, 15, 15 of the rain protection plates 11, 12, 13 thereby adhere tightly to the faces of the lighting material 1 and the adjacent rain protection plates 11, 12. When the rain protection plate 11 comprises one sheet, the length of the rain protection plate 11 is shorter than that of the lighting material 1.

FIG. 6(*b*) is the cross-sectional view along the FF line in FIG. 6(*a*) of the present invention 3, and shows the principles of the rain and snow protection device. The point of difference from the present invention 1 is that in the rain and snow protection device of the present invention 3, the rain protection plates 11, 12, 13 are connected to the moving device 21. The protection from rain comprises principles identical to those of the present invention 1, explained in FIG. 1(*b*), FIG. 2(*b*), FIG. 3(*b*), FIG. 4(*b*). Therefore, the explanations are omitted here.

As one example of the working mode, FIG. 7(*a*), FIG. 7(*b*), FIG. 7(*c*) show the mode of the moving device 21 of the present invention 3. There are no restrictions on the direction of motion of the rain protection plate 11 upon operating this moving device 21. In FIG. 7(*a*), the side edge 14 of the rain protection plate 11 is connected to the moving devices 21, 21 provided inside the vehicle and inside the side section 5 of the window frame 2. The rain protection slit 18 can be opened and closed by moving the rain protection plate 11 in the slantwise direction. In FIG. 7(*b*), the connection is made by the moving device 21 so that the rain protection plate 11 can move in an almost horizontal direction. The rain protection slit 18 can be opened and closed thereby. In FIG. 7(*c*), the connection is made by the moving device 21 so that the rain protection plate 11 can move in an almost vertical direction. The rain protection slit 18 can be opened and closed thereby. As one example of the working mode, in the moving devices 21, 21, the respective sliding members 43, 43 are inserted in the respective guide sections 42, 42. The sliding members 43, 43 are made to slide by means of the motor 46, 46. The rain protection slit 18 provided at the leading edge 15 of the rain protection plate 11 can be opened by widening the space 17 when it rains. When it is not raining, the rain protection slit 18 is sealed to prevent the incursion of dust, rain, and snow so that the air resistance during motion can be reduced.

The rain and snow protection device, described in claim 4 of this invention (hereinafter termed the present invention 4), is characterized as being constructed so that in a rain and snow protection device wherein one transparent rain protection plate (11) or a plurality of transparent rain protection plates (11, 12, 13) are provided on the outside of the vehicle toward the lighting material (1), in the direction downwards from the top edge section (3) or upwards from the bottom edge section (4) of the window flame (2) of the vehicle in which the lighting material (1) is inserted, wherein the faces of the aforementioned rain protection plates (11, 12, 13) are provided therein with spaces (17, 17) facing the lighting material (1) to form by this means the rain protection slits (18, 18) at the leading edges (15, 15) of the aforementioned rain protection plates (11, 12, 13), wherein the lengths of the aforementioned rain protection plates (11, 12, 13) relative to the lighting material (1) are shortened stepwise with increasing distance from the lighting material (1), wherein either of the side edges (14, 14) of the aforementioned rain protection plates (11, 12, 13) are not joined to but are in contact with either of the side sections (5, 5) of the window flame (2). The edges on one side of the aforementioned rain protection plates 11, 12, 13 extend inside the vehicle from the top edge 9 or the bottom edge 10 of the aforementioned window flame 2. The edges on one side of the aforementioned rain protection plates 11, 12, 13 are connected to one or a plurality of tilting devices 24, 24 provided inside the vehicle. The aforementioned tilting devices 24, 24 are positioned by design to form rain protection slits 18, 18 at the leading edges 15, 15 of the aforementioned rain protection plates 11, 12, 13. The air 47, 47 blown out from air jet nozzles 8, 8 provided at one location or a plurality of locations inside the vehicle passes through the aforementioned spaces 17, 17 and is blown out from the aforementioned rain protection slits 18, 18. The aforementioned rain protection slits 18, 18 can be sealed by operating the aforementioned tilting devices 24, 24 to tilt the aforementioned rain protection plates 11, 12, 13 toward the lighting material 1 and the adjacent rain protection plates 11, 12, 13 to narrow the aforementioned spaces 17, 17, and thereby have the leading edges 15, 15 of the aforementioned rain protection plates 11, 12, 13 adhere tightly to the faces of the lighting material 1 and the adjacent rain protection plates 11, 12, 13.

FIG. 8(*a*) is the figure showing the rain and snow protection device of the present invention 4, as one example of the working mode. Either of the side edges 14, 14 of the rain protection plates 11, 12, 13 of the rain and snow protection device described in Claim 1 is not joined to but is in contact with either of the side sections 5, 5 of the window frame 2. The edges on one side of the respective rain protection plates 11, 12, 13 extend inside the vehicle upwards from the bottom edge of the window frame 2. These respective edges on one side are connected to the tilting devices 24, 24 provided inside the vehicle, and positioned by design to form rain protection slits 18, 18, 18 at the leading edges 15, 15, 15 of the rain protection plates 11, 12, 13; the air jet nozzles 8, 8, 8 are provided at 3 locations inside the vehicle, and can emit strong air jets. The rain protection slits 18, 18, 18 can be sealed by operating these tilting devices 24, 24 to move the rain protection plates 11, 12, 13 closer to the lighting material 1 and the adjacent rain protection plates 11, 12 to narrow the spaces 17, 17, 17. The faces or the leading edges 15, 15, 15 of the rain protection plates 11, 12, 13 thereby adhere tightly to the faces of the lighting material 1 and the adjacent rain protection plates 11, 12. When the rain protection plate 11 comprises one sheet, the length of the rain protection plate 11 is shorter than that of the lighting material 1.

FIG. 8(*b*) is a cross-sectional view along the GG line in FIG. 8(*a*) of the present invention 4, and shows the principles of the rain and snow protection device. The point of difference from the present invention 1 is that in the rain and snow protection device of the present invention 4, the rain protection plates 11, 12, 13 are connected to the tilting device 24. The protection from rain comprises principles identical to those of the present invention 1, explained in FIG. 1(*b*), FIG. 2(*b*), FIG. 3(*b*), FIG. 4(*b*). Therefore, the explanations are omitted here.

As one example of the working mode, FIG. 9(*a*), FIG. 9(*b*) show the principles of the tilting device 24 of the present invention 4. In FIG. 9(*a*), the figure shows that the bearings 23, 23, 23 attached to the bottom edges 10, 10 of the respective rain protection plates 11, 12, 13 support the respective shafts 22, 22, 22 provided inside the vehicle. The motor cylinder is connected to the leading edges of the supporting rods 49, 49, 49 extending downwards from the edges on one side of the rain protection plates 11, 12, 13. By pushing the motor cylinders 48, 48, 48 upwards in the slantwise direction as shown by the arrows, the rain protection plates 11, 12, 13 are tilted to seal the rain protection slits 18, 18, 18. When it is not raining, it is possible to prevent the incursion of dust, and reduce the air resistance when the vehicle is in motion. In FIG. 9(b), the figure shows that by pulling the motor cylinders 48, 48, 48 downwards in the slantwise direction as shown by the arrows, the rain protection plates 11, 12, 13 are tilted to open the rain protection slits 18, 18, 18. As one example of the working mode, the rain protection slits 18, 18, 18 can also be opened and closed by connecting the moving device and the tilting device to the rain protection plates 11, 12, 13 so that the moving and tilting motions occur concurrently.

The rain and snow protection device, described in Claim 5 of this invention (hereinafter termed the present invention 5), is characterized as being constructed so that a plurality of transparent rain protection members 32, 33, 34, constituting a plurality of transparent plates 25, 26, 27 that have leg sections 28, 29, 30 bent toward the inside at either of the side sections, are provided on the outside of the vehicle toward the lighting material 1, in the direction downwards from the top edge section 3, or upwards from the bottom edge section 4, of the window frame 2 of the vehicle in which the lighting material 1 is inserted, wherein the faces of the aforementioned rain protection members 32, 33, 34 are provided therein with spaces 17, 17 facing the lighting material 1 to form by this means the rain protection slits 18, 18 at the leading edges 35, 35 of the aforementioned rain protection members 32, 33, 34, wherein the lengths of the aforementioned rain protection members 32, 33, 34 relative to the lighting material 1 are shortened stepwise with increasing distance from the lighting material 1, wherein the trailing edges 31, 31 of the aforementioned leg sections 28, 29, 30 are joined to the outside faces of the lighting material 1 and/or either of the side sections 5, 5 of the aforementioned window frame 2, wherein, furthermore, the air 47, 47 blown out from the air jet nozzles 8, 8 provided at one location or a plurality of locations inside the vehicle passes through the aforementioned spaces 17, 17 and is blown out from the aforementioned rain protection slits 18, 18.

FIG. 10(a) is the figure showing the rain and snow protection device of the present invention 5, as one example of the working mode. Three transparent rain protection members 32, 33, 34, constituting 3 transparent plates 25, 26, 27 provided with the respective spaces 17, 17, 17, that have leg sections 28, 29, 30 bent toward the inside at either of the side sections, are provided on the outside of the vehicle toward the lighting material 1, in the direction upwards from the bottom edge section 4 of the window frame 2 of the vehicle in which the lighting material 1 is inserted. The rain protection slits 18, 18, 18 are formed at the leading edges 35, 35, 35 of the rain protection members 32, 33, 34, wherein the lengths of the rain protection members 32, 33, 34 relative to the lighting material 1 are shortened stepwise with increasing distance from the lighting material 1, wherein the trailing edges 31, 31 of the respective leg sections 28, 29, 30 are joined to either of the side sections 5, 5 of the window frame 2, wherein, furthermore, the air blown out from the air jet nozzle 8 provided at one location inside the vehicle passes through the respective spaces 17, 17, 17 and is blown out from the respective rain protection slits 18, 18, 18.

In the present invention 5, the point of difference from the present invention 1 is that instead of the rain protection plates 11, 12, 13, the rain protection members 32, 33, 34, constituting transparent plates 25, 26, 27 that have leg sections 28, 29, 30 bent toward the inside at either of the side sections, are joined to either of the side sections of the window frame 2. The protection from rain comprises principles identical to those of the present invention 1, explained in FIG. 1(b), FIG. 2(b), FIG. 3(b), FIG. 4(b), therefore, the explanations are omitted here. There are no restrictions on the angles of attachment and the lengths of the leg sections 28, 29, 30 of the rain protection members 32, 33, 34 of the present invention 5. The transparent plates 25, 26, 27 can protrude to the outside of the vehicle from either of the side sections 5, 5 of the window frame 2 and be joined. The field of vision at the side face of the vehicle can be made easily visible. Materials for these rain protection members 32, 33, 34 comprise transparent glass and plastic materials identical to those in the lighting material 1.

FIG. 10(b) is the cross-sectional view along the HH line in FIG. 10(a) of the present invention 5 that shows the mode of formation of the spaces 17, 17, 17 in the rain protection members 32, 33, 34 of the rain and snow protection device. FIG. 10(c) is the exploded sectional view of FIG. 10(b) of the present invention 5, wherein the leg sections 28, 29, 30 of the rain protection members 32, 33, 34 are attached.

The rain and snow protection device, described in Claim 6 of this invention (hereinafter termed the present invention 6), is characterized as being constructed so that in a rain and snow protection device wherein one sheet of the transparent rain protection member (32) or a plurality of transparent rain protection members (32, 33, 34), constituting one transparent plate (25) or a plurality of transparent plates (25, 26, 27) that have leg sections (28, 29, 30) bent toward the inside at either of the side sections, are provided on the outside of the vehicle toward the lighting material (1), in the direction downwards from the top edge section (3) or upwards from the bottom edge section (4) of the window frame (2) of the vehicle in which the lighting material (1) is inserted, wherein the faces of the aforementioned rain protection members (32, 33, 34) are provided therein with spaces (17, 17) facing the lighting material (1) to form thereby the rain protection slits (18, 18) at the leading edges (35, 35) of the aforementioned rain protection members (32, 33, 34), wherein the lengths of the aforementioned rain protection members (32, 33, 34) relative to the lighting material (1) are shortened stepwise with increasing distance from the lighting material (1), wherein the trailing edges (31, 31) of the aforementioned leg sections (28, 29, 30) are not joined to but are in contact with the outside face of the lighting material (1) and/or either of the side sections (5, 5) of the aforementioned window frame (2). The edges on one side of the aforementioned rain protection members 32, 33, 34 extend inside the vehicle from the top edge 36 or the bottom edge 37 of the aforementioned window frame 2. The edges on one side of the aforementioned rain protection members 32, 33, 34 are connected to one or a plurality of moving devices 21, 21 provided inside the vehicle. The aforementioned moving devices 21, 21 are positioned by design to form rain protection slits 18, 18 at the leading edges 35, 35 of the aforementioned rain protection members 32, 33, 34. The air 47, 47 blown out from air jet nozzles 8, 8 provided at one location or a plurality of locations inside the vehicle passes through the aforementioned spaces 17, 17 and is blown out from the aforementioned rain protection slits 18, 18. The rain protection slits 18, 18 can adhere tightly by operating the aforementioned plurality of moving devices 21, 21 to move closer to the lighting material 1 and the adjacent rain protection members 32, 33, 34 to narrow the aforementioned spaces 17, 17, and thereby have the faces or the leading edges 35, 35 of the rain protection members 32, 33, 34 adhere tightly to the faces of the lighting material 1 and the adjacent rain protection members 32, 33, 34.

FIG. 11(a) is the figure showing the rain and snow protection device of the present invention 6, as one example of the working mode. Either of the leg sections 28, 29, 30 of the rain protection members 32, 33, 34 of the present invention 6 is provided so that sliding motion is possible without being joined to either of the side sections 5, 5 of the window frame 2. The edges on one side of the respective rain protection members 32, 33, 34 extend inside the vehicle; these respective edges are connected to the moving devices 21, 21, positioned by design to form rain protection slits 18, 18, 18 at the leading edges 35, 35, 35 of the rain protection members 32, 33, 34. The air blown out with force from the air jet nozzles 8, 8, 8 provided at 3 locations inside the vehicle passes through the respective spaces 17, 17, 17 and is blown out from the rain protection slits 18, 18, 18. The rain protection slits 18, 18 can be sealed by operating these moving devices 21, 21 to move the rain protection members 32, 33, 34 closer to the lighting material 1 and the adjacent rain protection members 32, 33 to narrow the spaces 17, 17, 17 and thereby have the faces or the leading edges 35, 35, 35 of the rain protection members 32, 33, 34 adhere tightly to the faces of the lighting material 1 and the adjacent rain protection members 32, 33, 34. When the rain protection member 32 comprises one sheet, the length of the rain protection member 32 is shorter than that of the lighting material 1.

In the present invention 6, the point of difference from the present invention 3 is that instead of the rain protection plates 11, 12, 13, the rain protection members 32, 33, 34, constituting the transparent plates 25, 26, 27 that have leg sections 28, 29, 30 bent toward the inside at either of the side sections, are provided on either of the side sections 5, 5 of the window frame 2 so that sliding motion is possible. The mode of the moving devices 21, 21 in the present invention 6 is explained in FIG. 7(*a*), FIG. 7(*b*), FIG. 7(*c*), therefore, the explanations are omitted here. Air can be blown out by operating the moving devices 21, 21 in the present invention 6 to open the rain protection slits 18, 18, 18. When the moving devices 21, 21 are operated to seal the rain protection slits 18, 18, 18, the air resistance during the motion of the vehicle is reduced, and the incursion of dust can be prevented.

FIG. 11(*b*) is the cross-sectional view along the II line in FIG. 11(*a*) of the present invention 6, and shows the mode of formation of the spaces 17, 17, 17 of the rain protection members 32, 33, 34 of the rain and snow protection device. FIG. 11(*c*) shows that either of the leg sections 28, 29, 30 of the rain protection members 32, 33, 34 attached downwards from the top edge section 3 of the window frame 2, is provided so that sliding motion is possible without being joined to either of the side sections 5, 5 of the window frame 2. The edges on one side of the respective rain protection members 32, 33, 34 extend inside the vehicle from the bottom edge section 4 of the window frame 2. These respective edges on one side are connected to the moving devices 21, 21, provided inside the vehicle and positioned by design to form rain protection slits 18, 18, 18 at the leading edges 35, 35, 35 of the rain protection members 32, 33, 34. The air blown out with force from the air jet nozzles 8, 8, 8 provided at 3 locations inside the vehicle passes through the respective spaces 17, 17, 17 and is blown out from the rain protection slits 18, 18, 18. The rain protection slits 18, 18 can be sealed by operating these moving devices 21, 21 to have the leading edges 35, 35, 35 of the rain protection members 32, 33, 34 adhere tightly to the faces of the lighting material 1 and the adjacent rain protection members 32, 33, 34.

The rain and snow protection device of the present invention 7 is characterized as being constructed so that in a rain and snow protection device wherein one sheet of the transparent rain protection member (32) or a plurality of transparent rain protection members (32, 33, 34), constituting one transparent plate (25) or a plurality of transparent plates (25, 26, 27) that have leg sections (28, 29, 30) bent toward the inside at either of the side sections, are provided on the outside of the vehicle toward the lighting material (1), in the direction downwards from the top edge section (3) or upwards from the bottom edge section (4) of the window frame (2) of the vehicle in which the lighting material (1) is inserted, wherein the faces of the aforementioned rain protection members (32, 33, 34) are provided therein with spaces (17, 17) facing the lighting material (1) to form thereby the rain protection slits (18, 18) at the leading edges (35, 35) of the aforementioned rain protection members (32, 33, 34), wherein the lengths of the aforementioned rain protection members (32, 33, 34) relative to the lighting material (1) are shortened stepwise with increasing distance from the lighting material (1), wherein the trailing edges (31, 31) of the aforementioned leg sections (28, 29, 30) are not joined to but are in contact with the outside face of the lighting material (1) and/or either of the side sections (5, 5) of the aforementioned window frame (2). The edges on one side of the aforementioned rain protection members 32, 33, 34 extend inside the vehicle from the top edge 36 or the bottom edge 37 of the aforementioned window frame 2. The edges on one side of the aforementioned rain protection members 32, 33, 34 are connected to one or a plurality of tilting devices 24, 24 provided inside the vehicle. The aforementioned tilting devices 24, 24 are positioned by design to form rain protection slits 18, 18 at the leading edges 35, 35 of the aforementioned rain protection members 32, 33, 34. The air 47, 47 blown out from air jet nozzles 8, 8 provided at one location or a plurality of locations inside the vehicle passes through the aforementioned spaces 17, 17 and is blown out from the aforementioned rain protection slits 18, 18. The aforementioned rain protection slits 18, 18 can be sealed by operating the aforementioned tilting devices 24, 24 and tilting toward the lighting material 1 and the adjacent rain protection members 32, 33, 34 to narrow the aforementioned spaces 17, 17, and thereby have the leading edges 35, 35 of the aforementioned rain protection members 32, 33, 34 adhere tightly to the faces of the lighting material 1 and the adjacent rain protection members 32, 33, 34.

FIG. 12(*a*) is the figure showing the rain and snow protection device of the present invention 7, as one example of the working mode. Either of the leg sections 28, 29, 30 of the rain protection members 32, 33, 34 of the present invention 7 is provided so that sliding motion is possible without being joined to either of the side sections 5, 5 of the window frame 2. The tilting devices 24, 24, provided inside the vehicle and in either of the side sections 5, 5 of the window frame 2, are connected to the leg sections 28, 29, 30 of the respective rain protection members 32, 33, 34, and are positioned by design to form rain protection slits 18, 18, 18 at the leading edges 35, 35, 35 of the rain protection members 32, 33, 34. The air blown out with force from the air jet nozzles 8, 8, 8 provided at 3 locations inside the vehicle passes through the respective spaces 17, 17, 17 and is blown out from the rain protection slits 18, 18, 18. The rain protection slits 18, 18 can be sealed by operating these tilting devices 24, 24 to move the rain protection members 32, 33, 34 closer to the faces of the lighting material 1 and the adjacent rain protection members 32, 33 to narrow the spaces 17, 17, 17 and thereby have the leading edges 35, 35, 35 of the rain protection members 32, 33, 34 adhere tightly to the faces of the lighting material 1 and the adjacent rain protection members 32, 33. In the present invention 7, the point of difference from the present invention 3 is that instead of the rain protection plates 11, 12, 13 in the present invention 3, the rain protection members 32, 33, 34, constituting the transparent plates 25, 26, 27 that have leg sections 28, 29, 30 bent toward the inside at either of the side sections, are provided on either of the side sections 5, 5 of the window frame 2 so that sliding motion is possible. The mode of the tilting devices 24, 24 in the present invention 6 is explained in FIG. 9(*a*), FIG. 9(*b*), therefore, the explanations are omitted here. The rain protection slits 18, 18, 18 can be sealed by operating the tilting devices 24, 24 of the present invention 7 to move the rain protection members 32, 33, 34 closer to the lighting material 1 and the adjacent rain protection members 32, 33 to narrow the spaces 17, 17, 17 and thereby have the faces or the leading edges 35, 35, 35 of the rain protection members 32, 33, 34 adhere tightly to the faces of the lighting material 1 and the adjacent rain protection members 32, 33. When it is not raining, the air resistance during the motion of the vehicle is reduced, and the incursion of dust can be prevented. When the rain protection member 32 comprises one sheet, the length of the rain protection member 32 is shorter than that of the lighting material 1.

FIG. 12(*b*) is the cross-sectional view along the JJ line in FIG. 12(*a*) of the present invention 7 that shows the mode of formation of the spaces 17, 17, 17 in the rain protection members 32, 33, 34 of the rain and snow protection device.

The rain and snow protection device of the present invention 8 is characterized as being constructed so that in a rain and snow protection device wherein one transparent rain protection plate 11 or a plurality of transparent rain protection plates 11, 12, 13 are provided on the outside of the vehicle toward the lighting material 1, in the direction downwards from the top edge section 3, or upwards from the bottom edge section 4, of the window frame 2 of the vehicle in which the lighting material 1 is inserted, wherein the faces of the one transparent rain protection plate 11 or the plurality of transparent rain protection plates 11, 12, 13 are provided therein with spaces 17, 17 facing the lighting material 1, wherein the lengths of the one transparent rain protection plate 11 or the plurality of transparent rain protection plates 11, 12, 13 relative to the lighting material 1 are shortened stepwise with increasing distance from the lighting material 1, wherein either of the side edges 14, 14 of the one transparent rain protection plate 11 or the plurality of transparent rain protection plates 11, 12, 13 are not joined to but are in contact with either of the side sections 5, 5 of the window frame 2. On the outside of the vehicle, on either of the side sections 5, 5 of the window frame 2 of the vehicle in which the lighting material 1 is inserted, the grooved frame 38 with one long groove or a plurality of grooved frames 38, 39, 40 respectively with grooves are attached, extending from either of the side sections 5, 5 upwards or downwards inside the vehicle. The one transparent rain protection plate 11 or the plurality of transparent rain protection plates 11, 12, 13 mentioned above are inserted in these grooved frames 38, 39, 40 so that sliding motion is possible. The edges on one side of the one transparent rain protection plate 11 or the plurality of rain protection plates 11, 12, 13 are connected to one or a plurality of sliding devices 41, 41 provided inside the vehicle. The aforementioned sliding devices 41, 41 are positioned by design to form the rain protection slits 18, 18 at the leading edges 15, 15 of the aforementioned rain protection plates 11, 12, 13. The air 47, 47 blown out from the air jet nozzles 8, 8, provided at one location or a plurality of locations inside the vehicle passes through the aforementioned spaces 17, 17 and is blown out from the aforementioned rain protection slits 18, 18. The aforementioned window frame 2 can be sealed by the aforementioned rain protection plates 11, 12, 13 by operating the aforementioned sliding devices 41, 41.

FIG. 13(*a*) is the figure showing the rain and snow protection device of the present invention 8, as one example of the working mode. In the present invention 8, on the outside of the vehicle, on either of the side sections 5, 5 of the window frame 2 of the vehicle in which the lighting material 1 of the present invention 8 is inserted, 3 grooved frames 38, 39, 40 are respectively attached, extending from either of the side sections 5, 5 downwards inside the vehicle. The transparent rain protection plates 11, 12, 13 are inserted in these grooved frames 38, 39, 40 so that sliding motion is possible. Either of the side edges 14, 14 of these rain protection plates 11, 12, 13 are connected to the sliding devices 41, 41 provided inside the vehicle. These sliding devices 41, 41 are positioned by design to form the rain protection slits 18, 18 at the leading edges 15, 15 of the rain protection plates 11, 12, 13. The air 47, 47, 47 blown out from the air jet nozzles 8, 8, 8 provided at 3 locations inside the vehicle passes through the spaces 17, 17, 17 and is blown out from the rain protection slits 18, 18, 18. The window frame 2 can be sealed by the rain protection plates 11, 12, 13 by operating the sliding devices 41, 41. When the rain protection plate 11 comprises one sheet, the length of the rain protection plate 11 is shorter than that of the lighting material 1.

In the present invention 8, the point of difference from the present invention 1 is that the sliding device 41 is connected to the rain protection plates 11, 12, 13 in the present invention 1. However, the protection from rain by the rain and snow protection device of the present invention 8 comprises principles almost identical to those of the present invention 1, therefore, the explanations are omitted here.

FIG. 13(*b*) is the cross-sectional view along the KK line in FIG. 13(*a*) of the present invention 8 that shows the mode of the spaces 17, 17, 17 in the rain protection plates 11, 12, 13. FIG. 13(*c*) is the exploded sectional view of the sliding device 41 in the present invention 8 as one example of the working mode. The rain protection slits 18, 18, 18 can be formed at the positions where the respective rain protection plates 11, 12, 13 are stopped in stepwise fashion, by the sliding motion of the rain protection plates 11, 12, 13 by means of rotation by the motors 46, 46 of the gears 44, 44 meshed to the rack gears 45, 45 attached to either of the side edges of the rain protection plates 11, 12, 13.

The rain and snow protection device of the present invention 9 is characterized as being constructed so that in a rain and snow protection device wherein one sheet of the transparent rain protection member (32) or a plurality of transparent rain protection members (32, 33, 34), constituting one transparent plate (25) or a plurality of transparent plates (25, 26, 27) that have leg sections (28, 29, 30) bent toward the inside at either of the side sections of the one transparent plate (25) or the plurality of transparent plates (25, 26, 27), are provided on the outside of the vehicle toward the lighting material (1), in the direction downwards from the top edge section (3) or upwards from the bottom edge section (4) of the window frame (2) of the vehicle in which the lighting material (1) is inserted, wherein the faces of the aforementioned rain protection members (32, 33, 34) are provided therein with spaces (17, 17) facing the lighting material (1) to form thereby the rain protection slits (18, 18) at the leading edges (35, 35) of the aforementioned rain protection members (32, 33, 34), wherein the lengths of the aforementioned rain protection members (32, 33, 34) relative to the lighting material (1) are shortened stepwise with increasing distance from the lighting material (1), wherein the trailing edges (31, 31) of the aforementioned leg sections (28, 29, 30) are not joined to but are in contact with the outside faces of the lighting material (1) and/or either of the side sections (5, 5) of the aforementioned window frame (2). On the outside of the vehicle, on either of the side sections 5, 5 of the window frame 2 of the vehicle in which the lighting material 1 is inserted, the grooved frame 38 with one long groove or a plurality of grooved frames 38, 39, 40 with grooves are attached, extending from either of the side sections 5, 5 upwards or downwards inside the vehicle. The leg sections 28, 29, 30 of the aforementioned rain protection members 32, 33, 34 are inserted in these grooved frames 38, 39, 40 so that sliding motion is possible. The edges on one side of the aforementioned rain protection members 32, 33, 34 are connected to one or a plurality of sliding devices 41, 41 provided inside the vehicle. The aforementioned sliding devices 41, 41 are positioned by design to form the rain protection slits 18, 18 at the leading edges 15, 15 of the aforementioned rain protection members 32, 33, 34. The air 47, 47 blown out from the air jet nozzles 8, 8 provided at one location or a plurality of locations inside the vehicle passes through the aforementioned spaces 17, 17 and is blown out from the aforementioned rain protection slits 18, 18. The aforementioned window frame can be sealed by the aforementioned rain protection members 32, 33, 34 by operating the aforementioned sliding devices 41, 41.

FIG. 14(a) is the figure showing the rain and snow protection device of the present invention 9, as one example of the working mode. On the outside of the vehicle, on either of the side sections 5, 5 of the window frame 2 of the vehicle in which the lighting material 1 of the present invention 9 is inserted, 3 grooved frames 38, 39, 40 are respectively attached, extending from either of the side sections 5, 5 downwards inside the vehicle. The transparent rain protection members 32, 33, 34 provided with the bent leg sections 28, 29, 30 are inserted in the respective grooved frames 38, 39, 40 so that sliding motion is possible. The sliding devices 41, 41 provided inside the vehicle and on either of the side sections 5, 5 of the window frame 2 are connected to either of the leg sections 28, 29, 30 of these rain protection members 32, 33, 34. These sliding devices 41, 41 are positioned by design to form rain protection slits 18, 18 at the leading edges 35, 35 of the rain protection members 32, 33, 34. The air 47, 47, 47 blown out from the air jet nozzles 8, 8, 8 provided at 3 locations inside the vehicle passes through the spaces 17, 17, 17 and is blown out from the rain protection slits 18, 18, 18. The window frame 2 can be sealed by the rain protection members 32, 33, 34 by operating the sliding devices 41, 41. When the rain protection member 32 comprises one sheet, the length of the rain protection member 32 is shorter than that of the lighting material 1.

FIG. 14(b) is the cross-sectional view along the LL line in FIG. 14(a) of the present invention 9 that shows the mode of the space 17 in the rain protection members 32, 33, 34 of the present invention 9. In the present invention 9, the point of difference from the present invention 5 is that the sliding device 41 is connected to the rain protection members 32, 33, 34 in the present invention 5. However, the protection from rain by the rain and snow protection device of the present invention 9 comprises principles identical to those of the present invention 5, therefore, the explanations are omitted here.

As one example of the working mode, FIG. 15(a), FIG. 15(b), FIG. 15(c) comprise the figure of the sliding device 41 of the present invention 9. The figure shows the mode wherein either of the side sections of the transparent plates 25, 26, 27 is bent toward the inside. FIG. 15(a) is the figure wherein the bent leg sections 28, 29, 30 are attached almost vertically. The rack gears 45, 45, 45 are attached to the respective trailing edges 31, 31, 31 of the 3 sheets of transparent rain protection members 32, 33, 34. The gears 44, 44, 44 are meshed to these rack gears 45, 45, 45. By means of the rotation of the motors 46, 46, 46 to which these gears 44, 44, 44 are attached, the respective rain protection members 32, 33, 34 undergo sliding motion so that the rain protection slits 18, 18, 18 can be provided at the stepwise stopping positions. Moreover, by sealing the window flame 2 by means of the respective rain protection members 32, 33, 34, the rain protection slits 18, 18, 18 are hidden.

FIG. 15(b) is the figure of the variation of the sliding device 41 of the present invention 9. As one example of the working mode, the bent leg sections 28, 29, 30 are attached slantwise and tilted at either of the side sections of the transparent plates 25, 26, 27. The rack gears 45, 45, 45 are attached to the trailing edges 31, 31, 31 of these leg sections 28, 29, 30; the gears 44, 44, 44 are meshed to these rack gears 45, 45, 45. By means of the rotation of the motors 46, 46, 46 to which these gears 44, 44, 44 are attached, the respective rain protection members 32, 33, 34 can undergo sliding motion. The rain and snow protection device of the present invention 9 is suitable for automobile, Shinkansen (Japanese bullet train), and aircraft, where the vehicles have streamlined shapes.

The motor vehicles mentioned in the present invention comprise automobiles, buses, streetcars, bikes with roofs, cranes for outdoor operations, and bulldozers; ships comprise vessels, tankers, yachts, and hovercraft; aircraft comprise airplanes, helicopters, and blimps, for example. The motion mentioned in the present invention signifies run in the case of automobiles, voyage in the case of ships, run or fly in the case of aircraft. The driver mentioned in the present invention signifies driver in motor vehicles, steersman in ships, pilot in aircraft.

POTENTIAL FOR INDUSTRIAL UTILIZATION

As described above, in the rain and snow protection device of the present invention, the window of the vehicle has no operating parts such as wipers. The attachment can be made at almost the same angle as the lighting material. Therefore, the shape is such that air resistance during motion is considerably reduced. Externally, only the superposition of the transparent rain protection plates on the lighting material is visible on the outside of the vehicle. The plurality of rain protection plates provided with spaces have the effect of absorbing impact toward the colliding object. Moreover, by using a high performance blower to cope with the large amount of rainfall when the vehicle moves at high speed, the rain and snow protection device is suitable for use instead of wipers.

EXPLANATION OF THE LEGEND

Figure 1A:
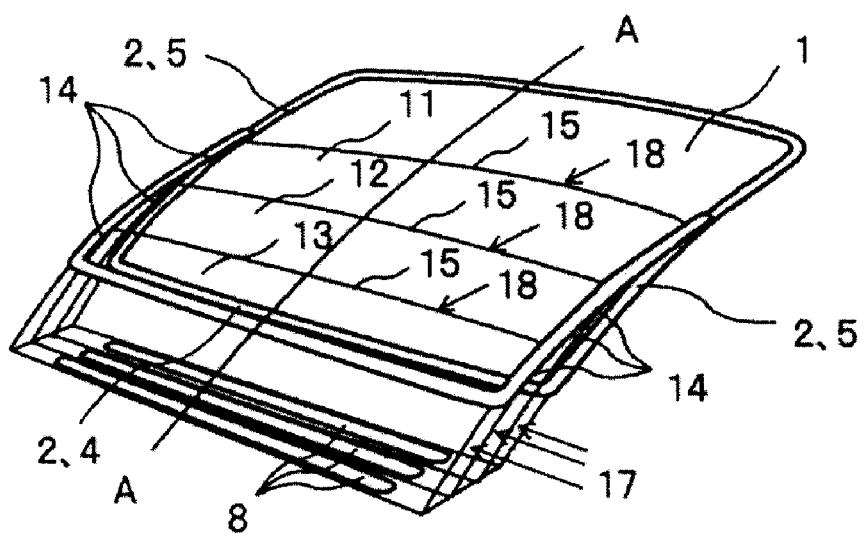
FIG. 1(a) Figure showing one example of the working mode of the present invention 1.
Figure 1B:
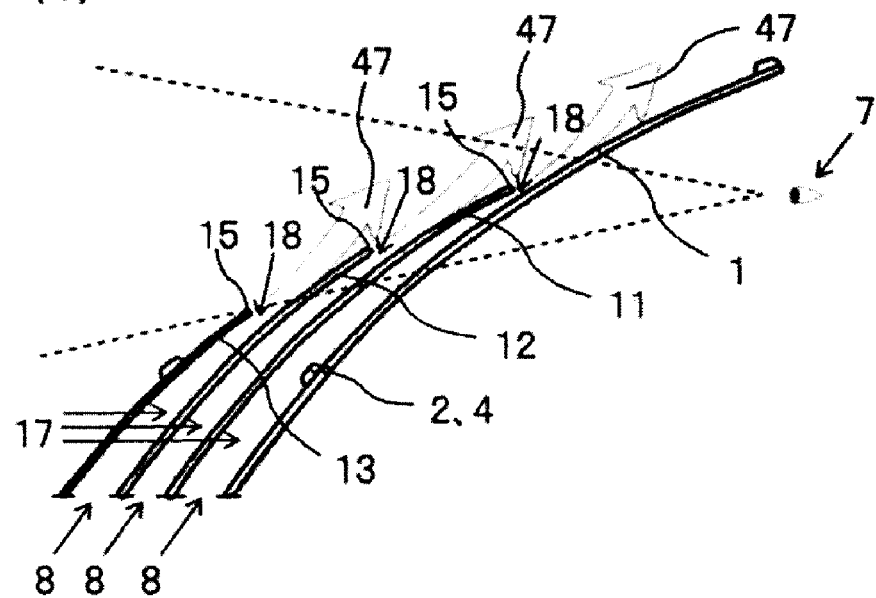
FIG. 1(b) Cross-sectional view along the AA line in FIG. 1/1 of the present invention 1.
Figure 2A:
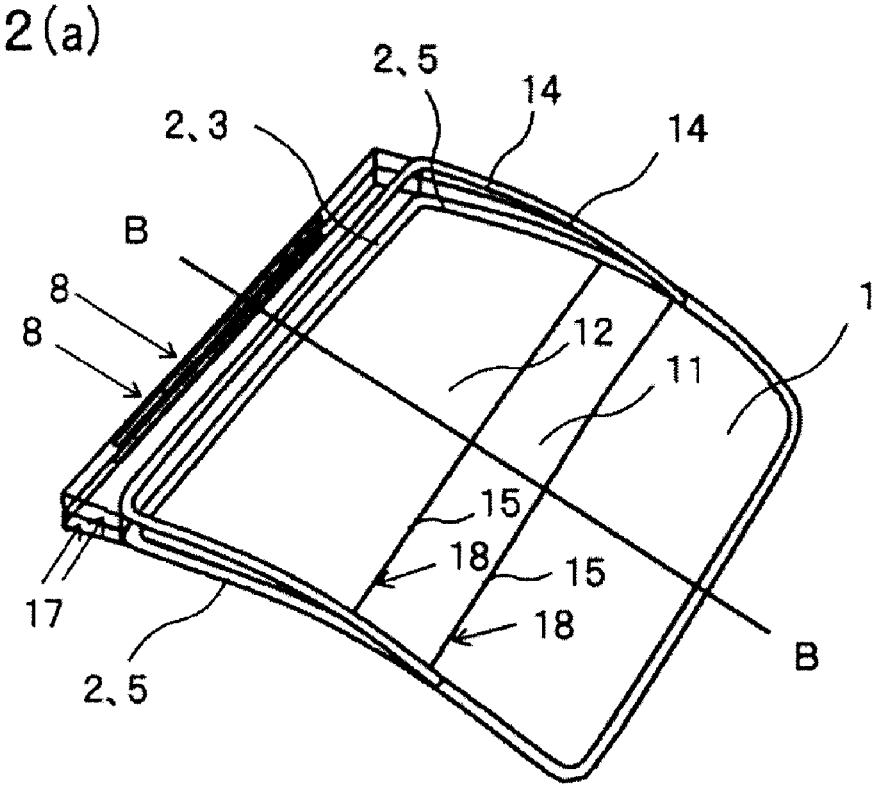
FIG. 2(a) Figure showing one example of the working mode of the present invention 1.
Figure 2B:
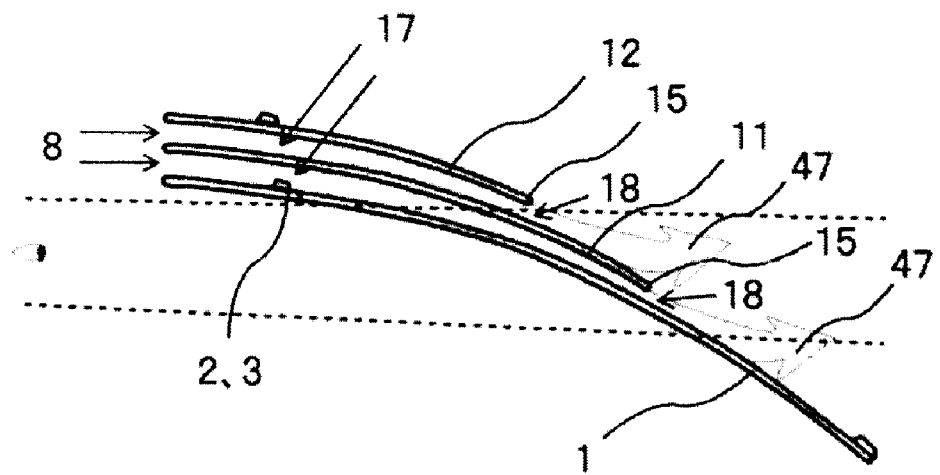
FIG. 2(b) Cross-sectional view along the BB line in FIG. 2/1 of the present invention 1.
Figure 3A:
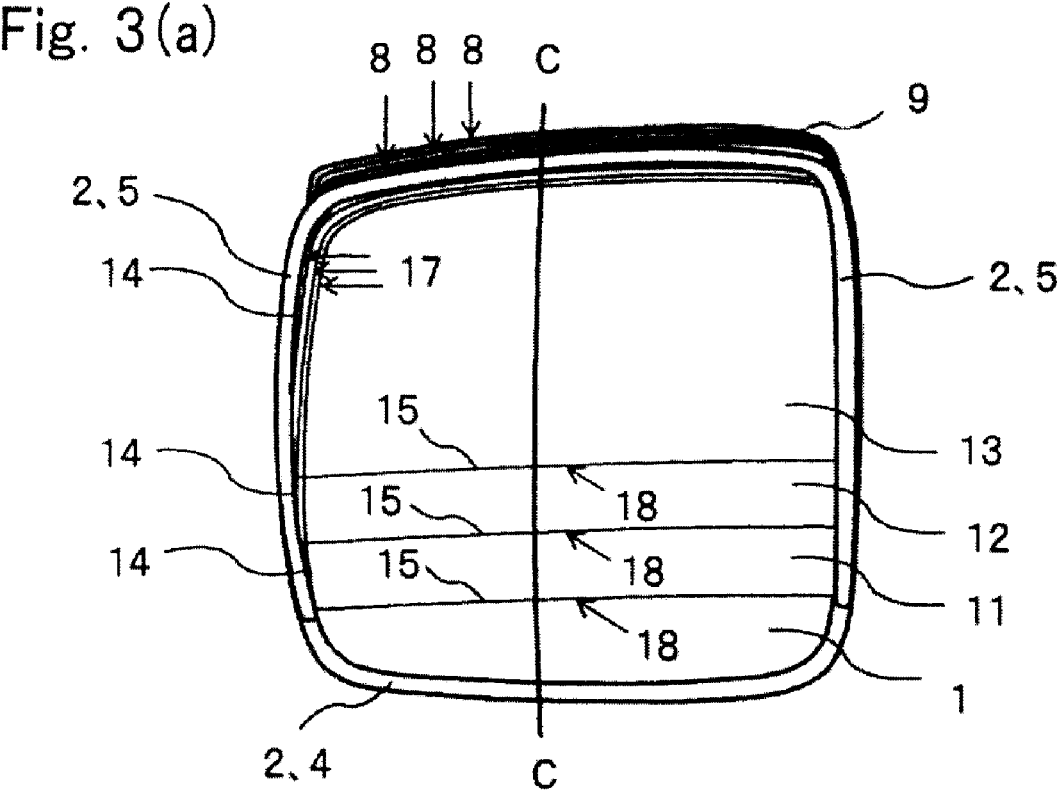
FIG. 3(a) Figure showing one example of a different working mode of the present invention 1.
Figure 3B:
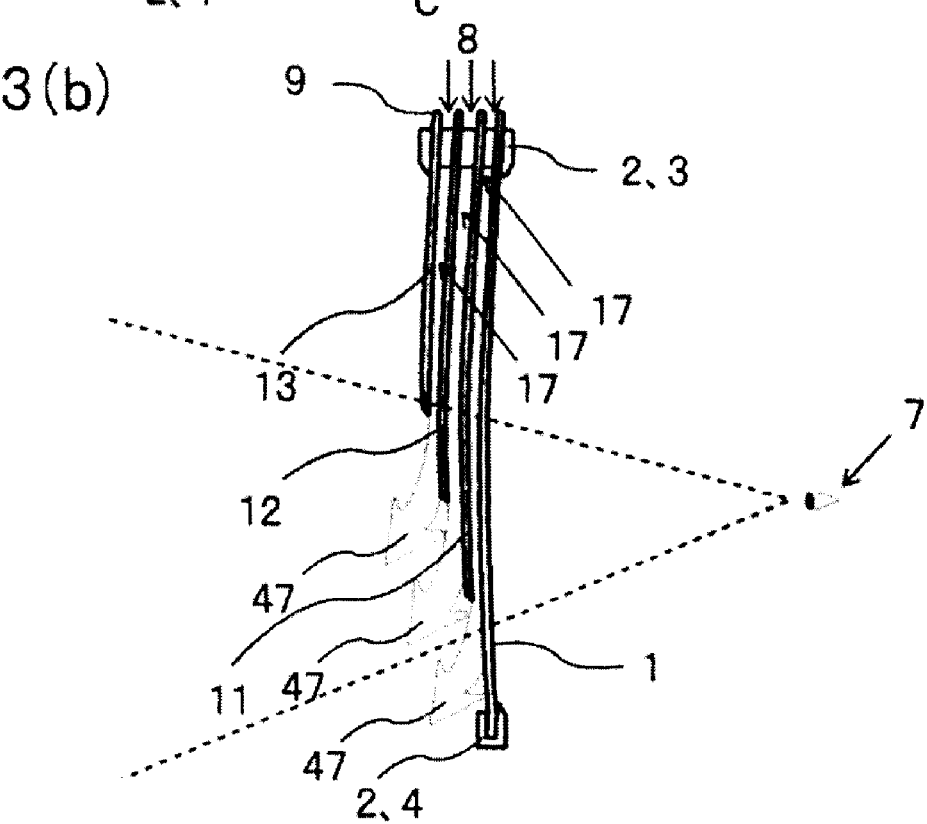
FIG. 3(b) Cross-sectional view along the CC line in FIG. 3/1 of the present invention 1.
Figure 4A:
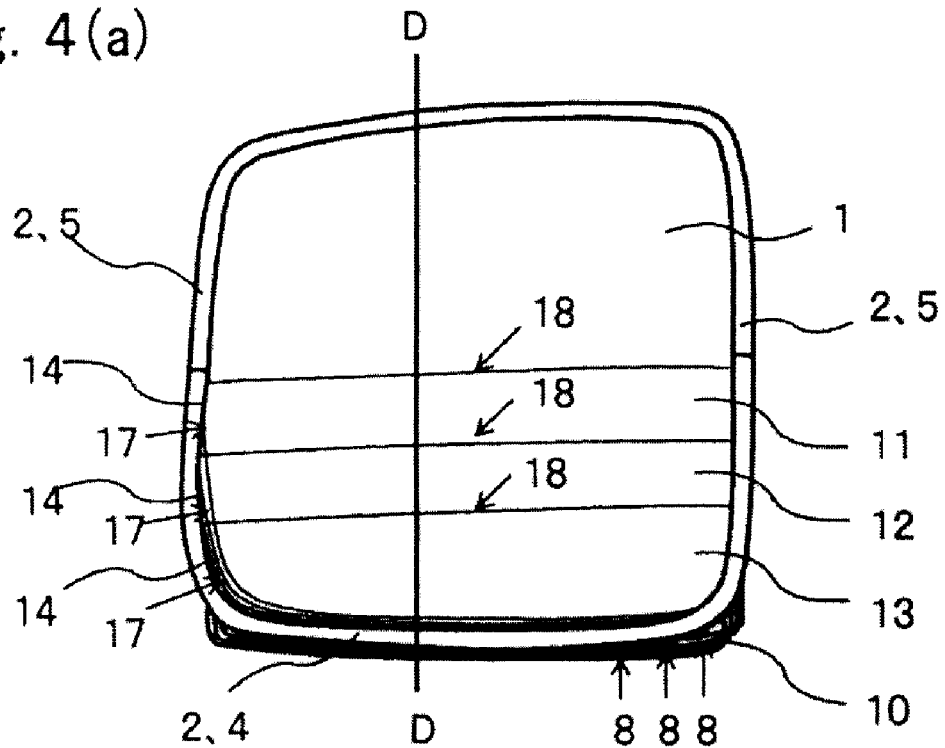
FIG. 4(a) Figure showing one example of a different working mode of the present invention 1.
Figure 4B:
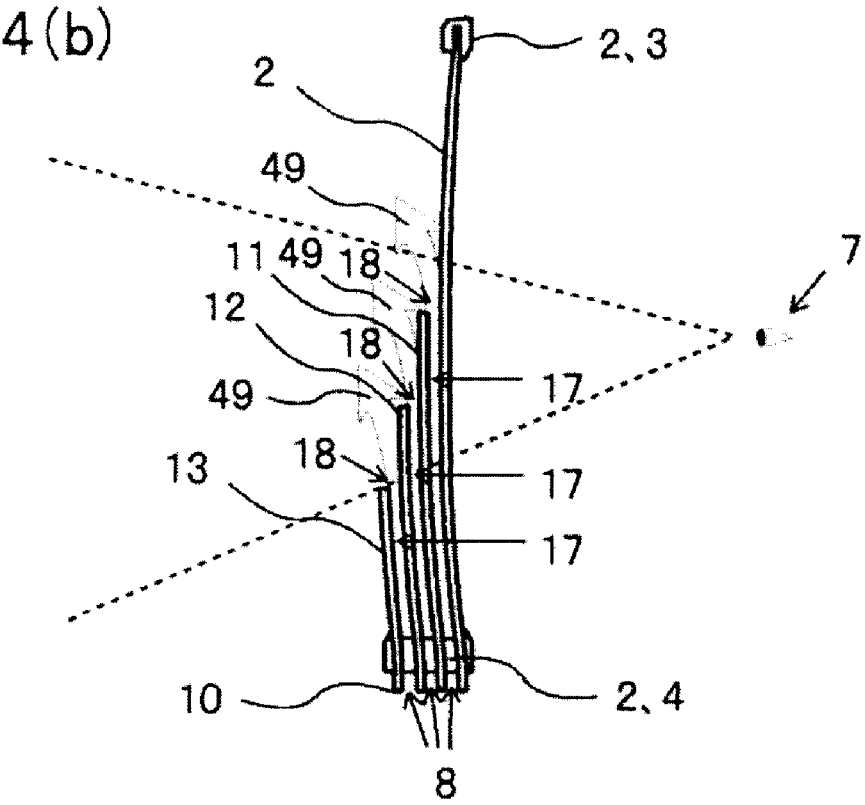
FIG. 4(b) Cross-sectional view along the DD line in FIG. 4/1 of the present invention 1.
Figure 5A:
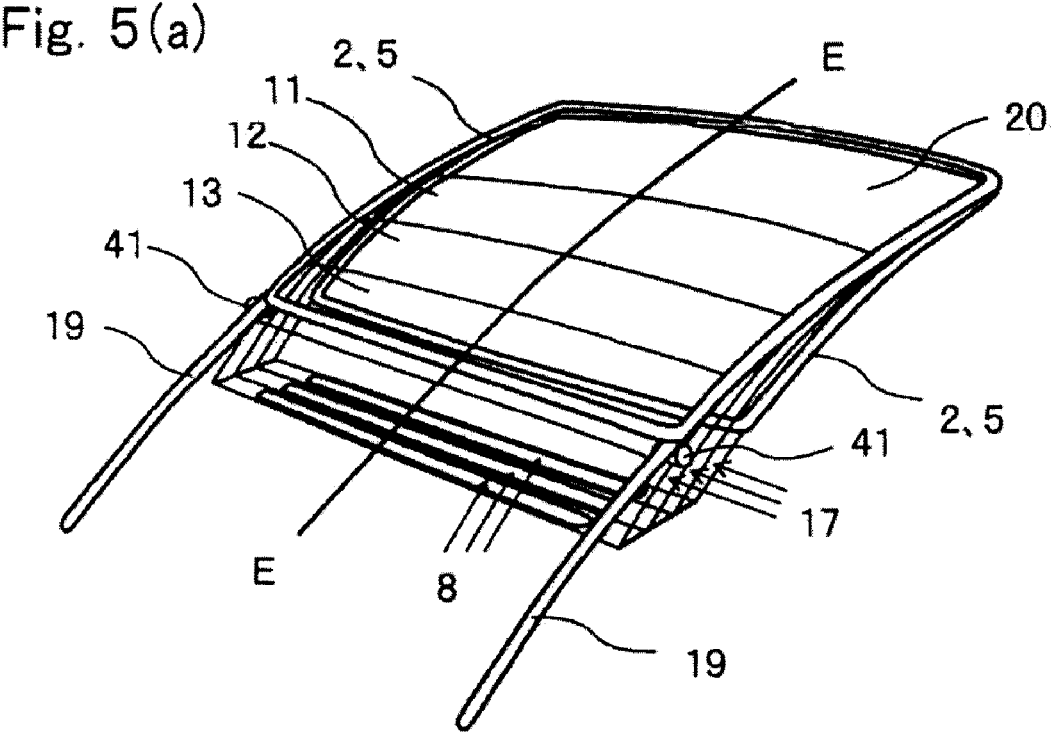
FIG. 5(a) Figure showing one example of the working mode of the present invention 2.
Figure 5B:
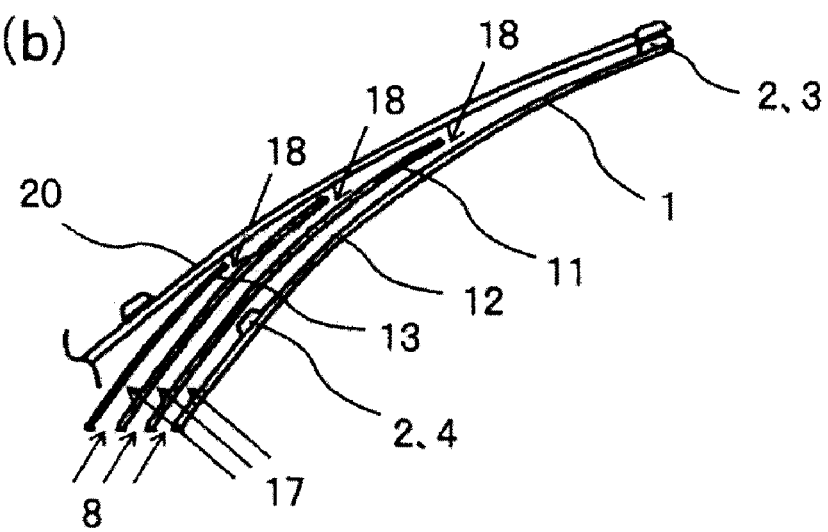
FIG. 5(b) Cross-sectional view along the EE line in FIG. 5/1 of the present invention 2.
Figure 5C:
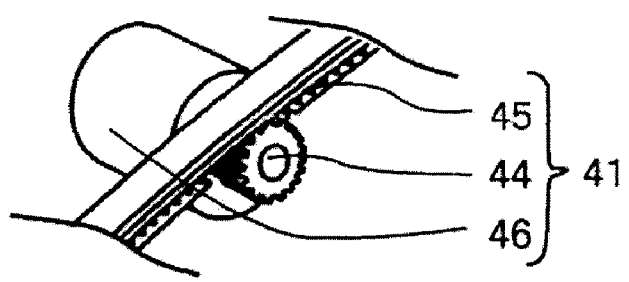
FIG. 5(c) Figure showing the sliding device in one example of the working mode of the present invention 2.
Figure 6A:
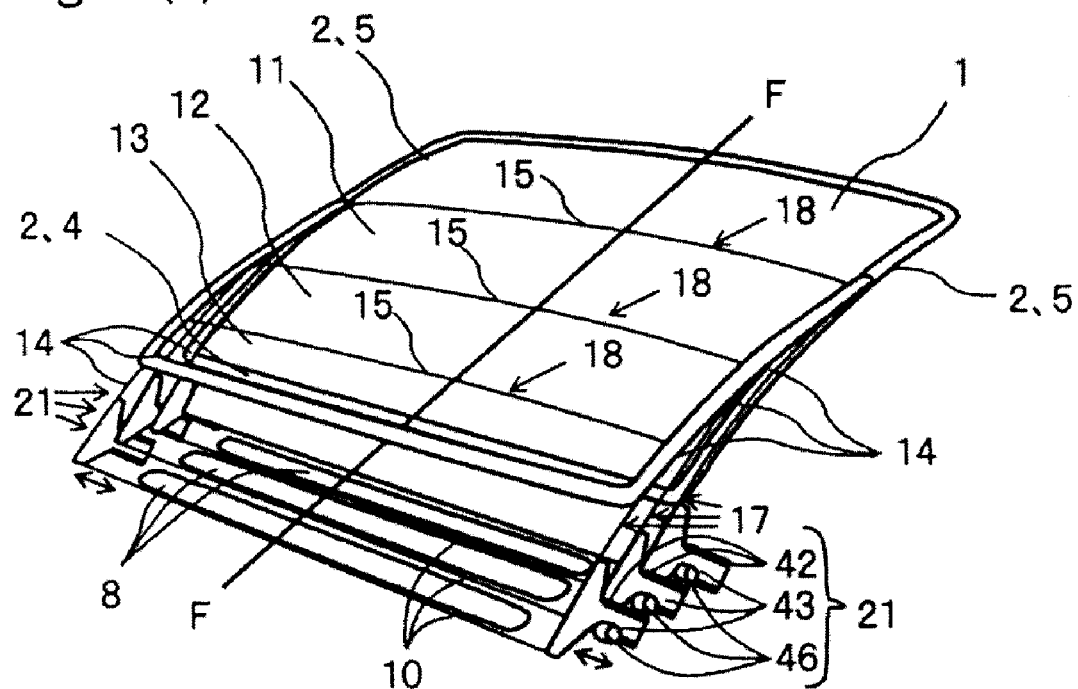
FIG. 6(a) Figure showing one example of the working mode of the present invention 3.
Figure 6B:
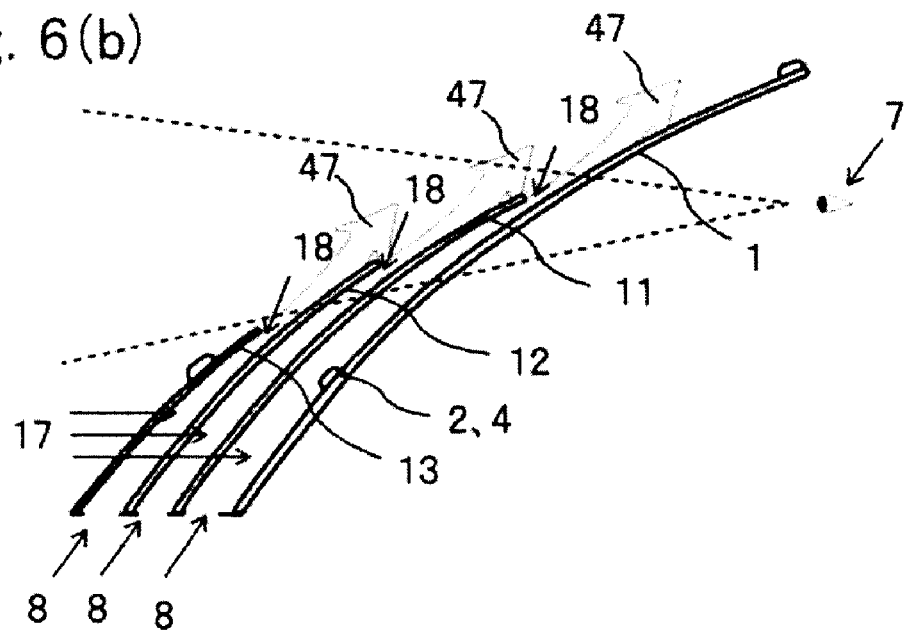
FIG. 6(b) Cross-sectional view along the FF line in FIG. 6/1 of the present invention 3.
Figure 7A:
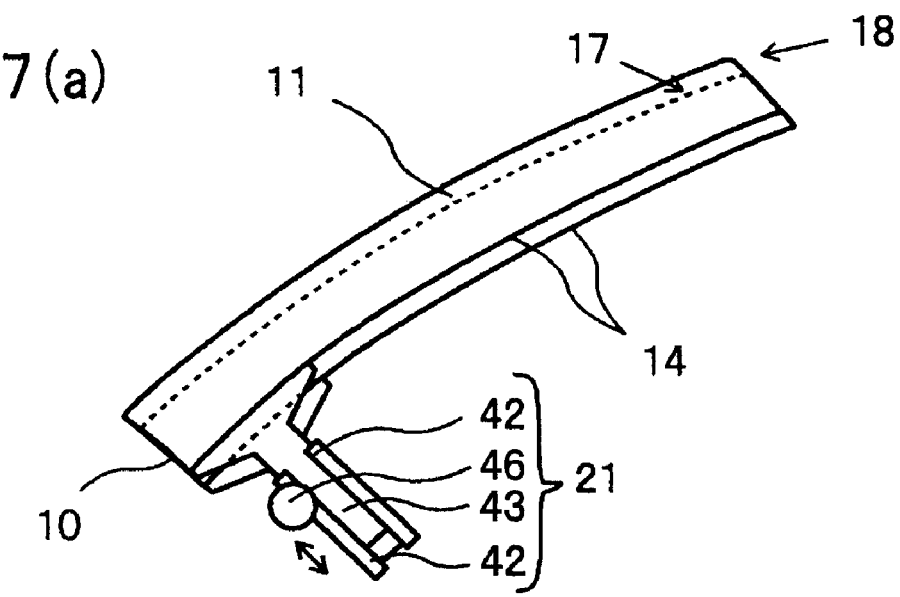
FIG. 7(a) Figure showing the moving device in one example of the working mode of the present invention 4.
Figure 7B:
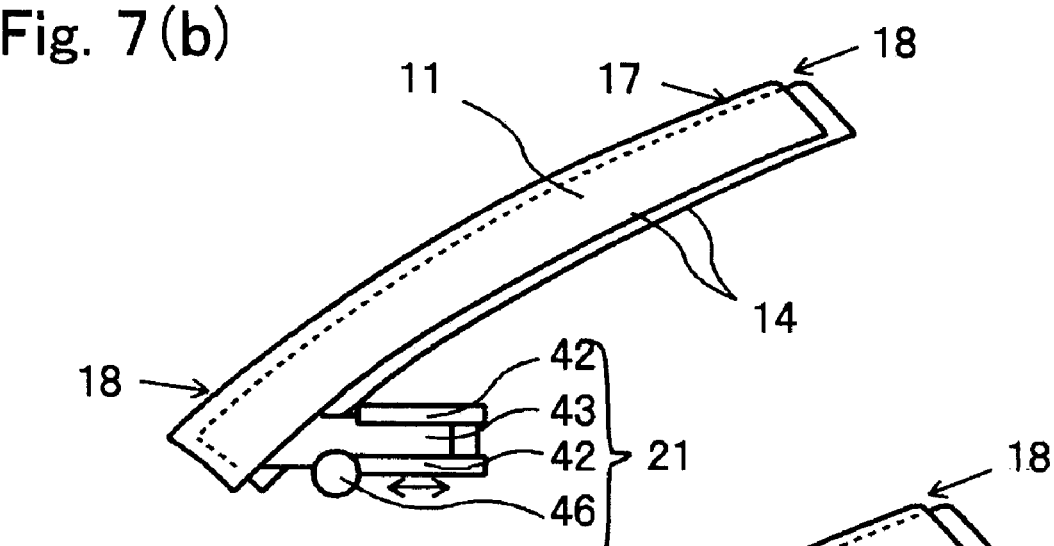
FIG. 7(b) Figure showing the moving device in one example of the working mode of the present invention 4.
Figure 7C:
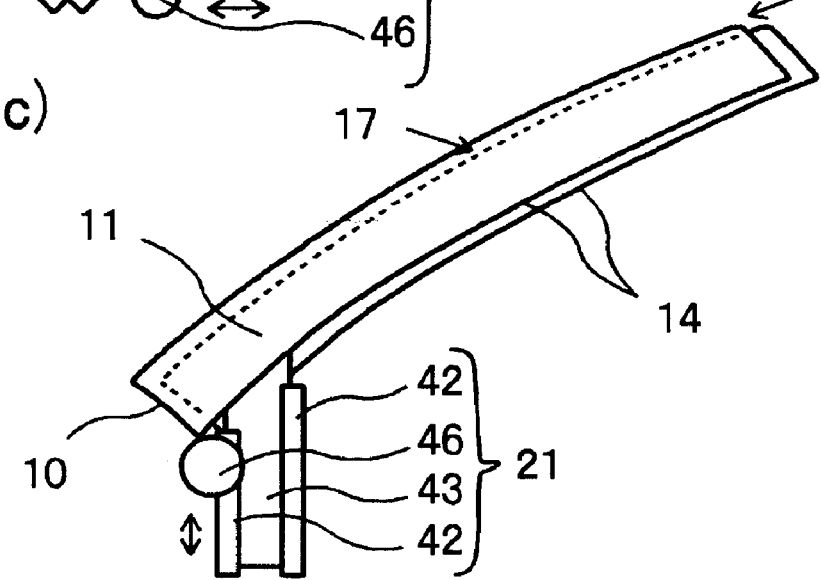
FIG. 7(c) Figure showing the moving device in one example of the working mode of the present invention 4.
Figure 8A:
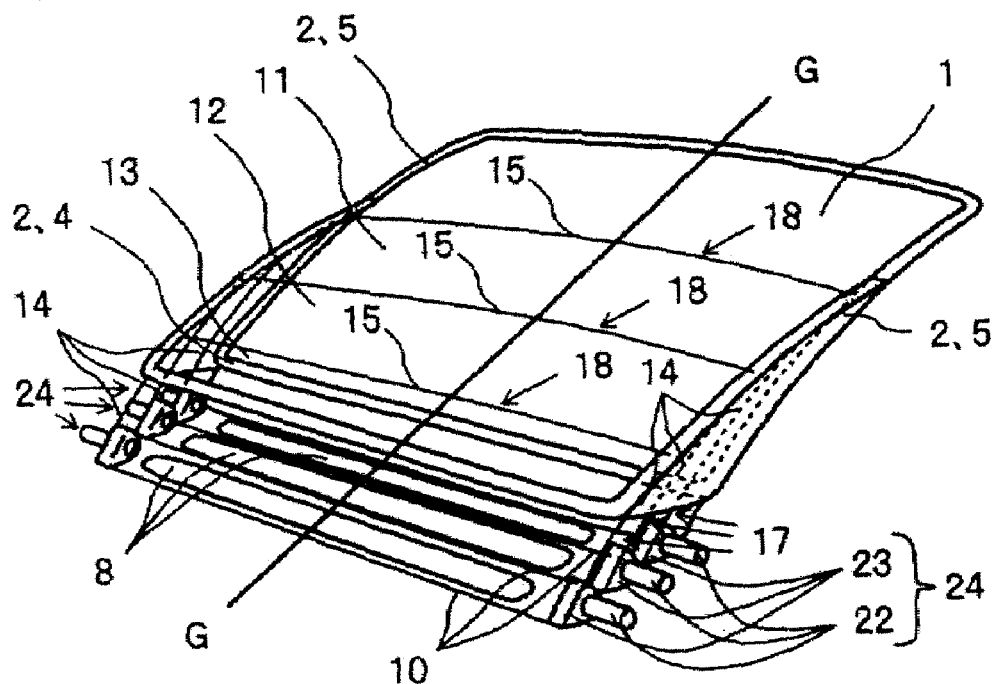
FIG. 8(a) Figure showing one example of the working mode of the present invention 4.
Figure 8B:
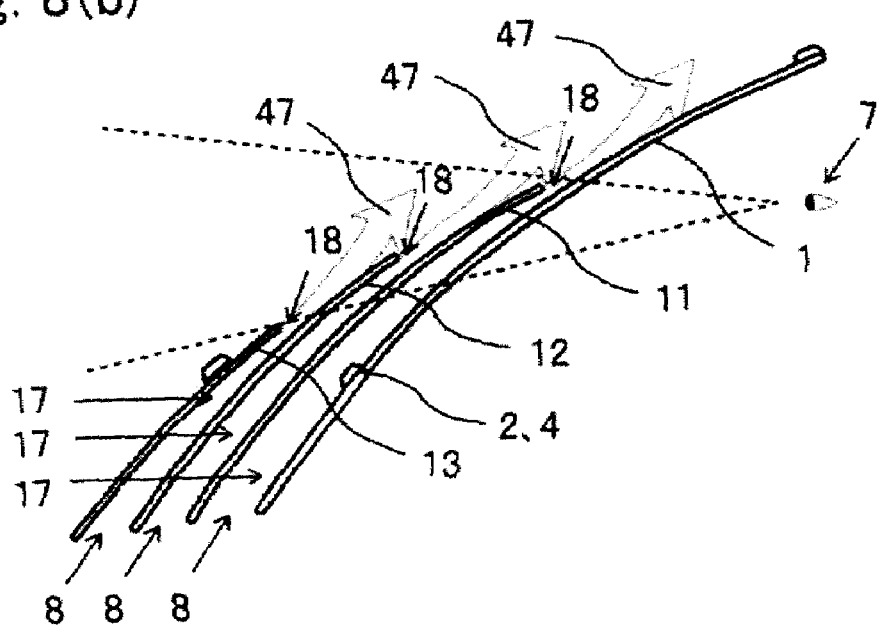
FIG. 8(b) Cross-sectional view along the GG line in FIG. 8/1 of the present invention 4.
Figure 9A:
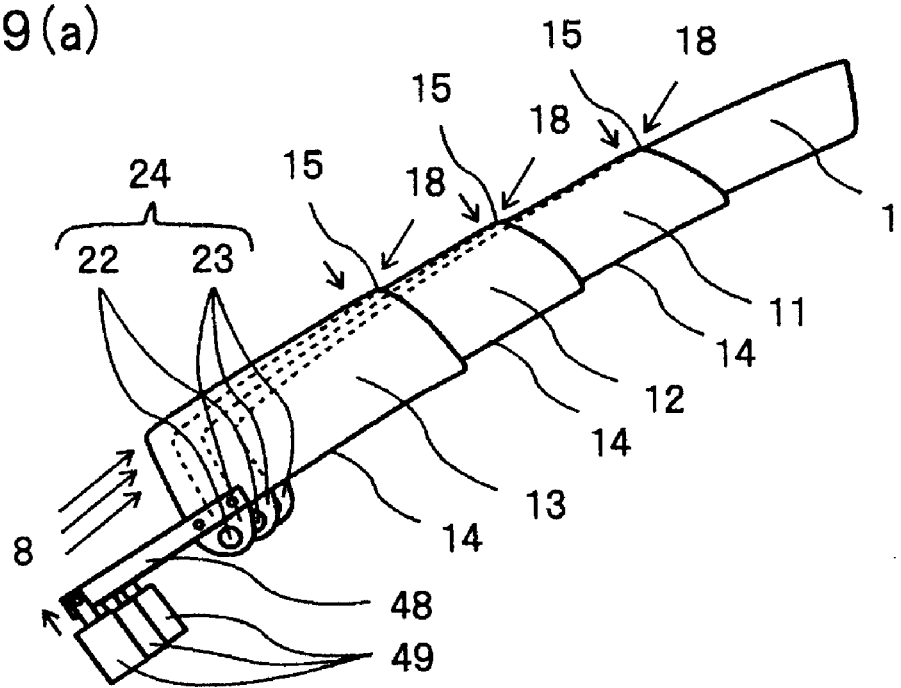
FIG. 9(a) Figure showing the tilting device in one example of the working mode of the present invention 4.
Figure 9B:
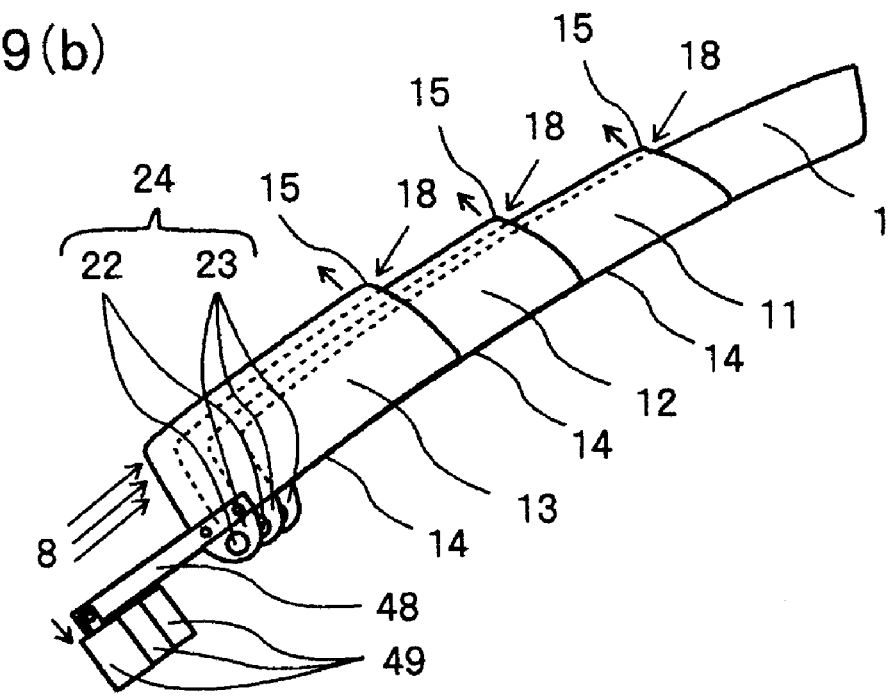
FIG. 9(b) Figure showing the tilting device in one example of the working mode of the present invention 4.
Figure 10A:
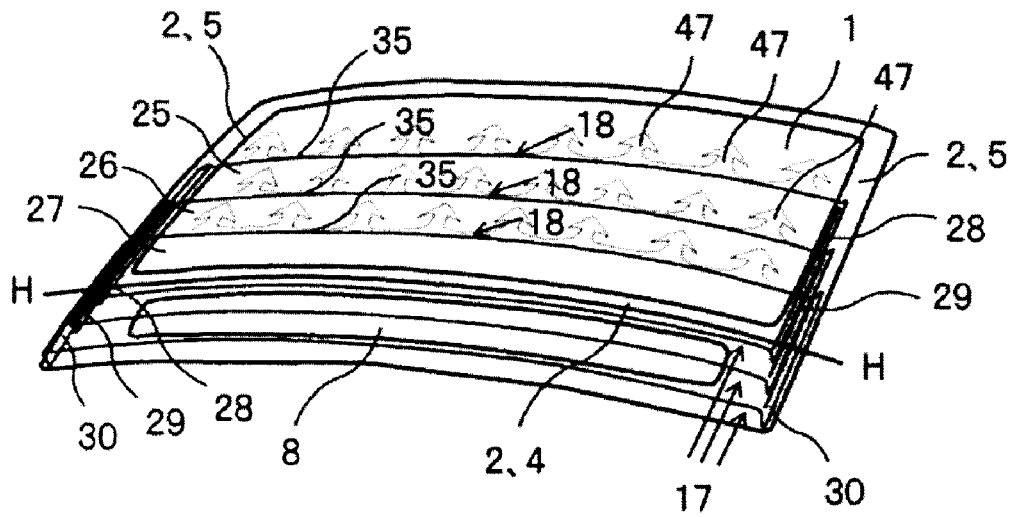
FIG. 10(a) Figure showing one example of the working mode of the present invention 5.
Figure 10B:
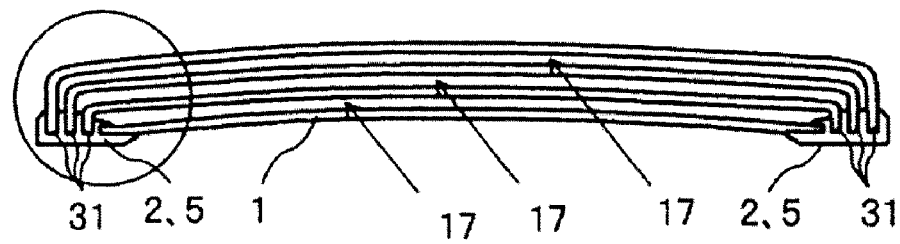
FIG. 10(b) Cross-sectional view along the HH line in FIG. 10/1 of the present invention 5.
Figure 10C:
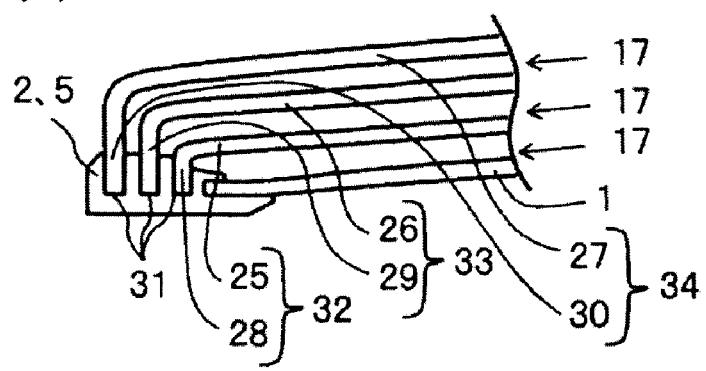
FIG. 10(c) Exploded sectional view of FIG. 10/2 of the present invention 5.
Figure 11A:
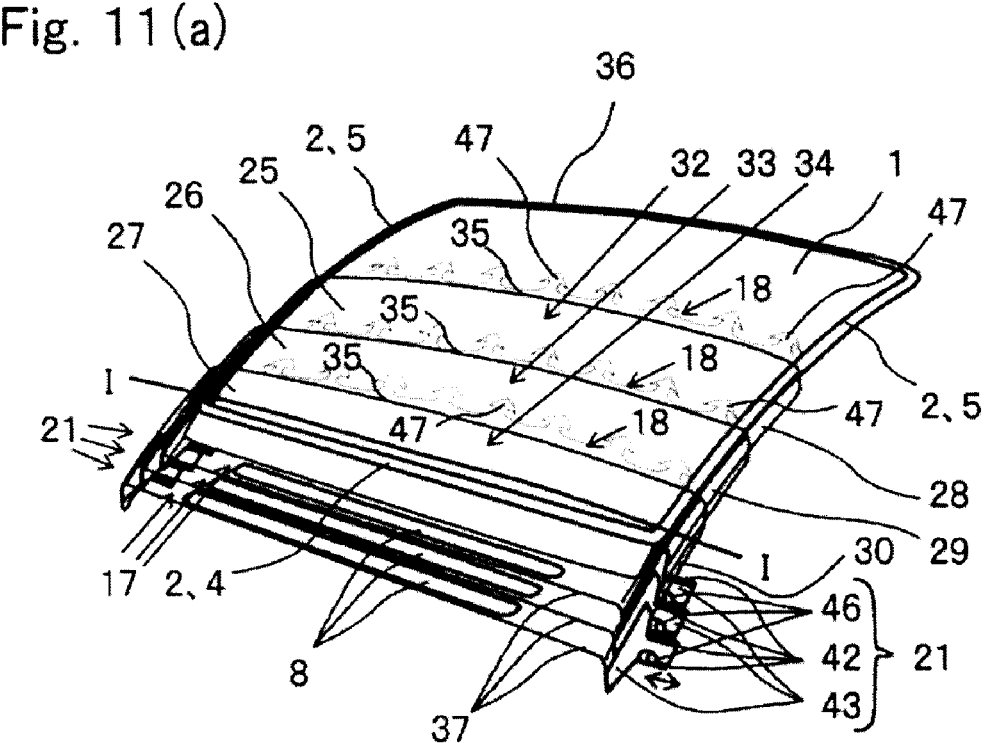
FIG. 11(a) Figure showing one example of the working mode of the present invention 6.
Figure 11B:
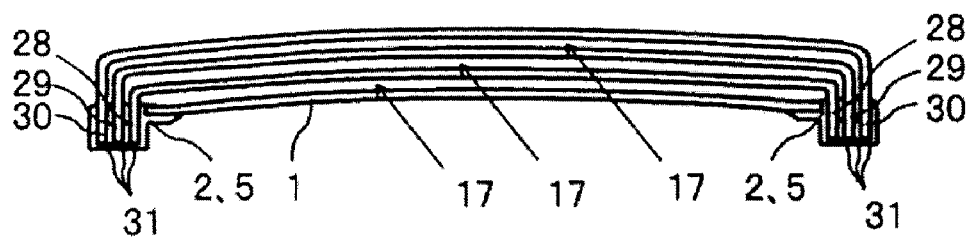
FIG. 11(b) Cross-sectional view along the II line in FIG. 11/1 of the present invention 6.
Figure 12A:
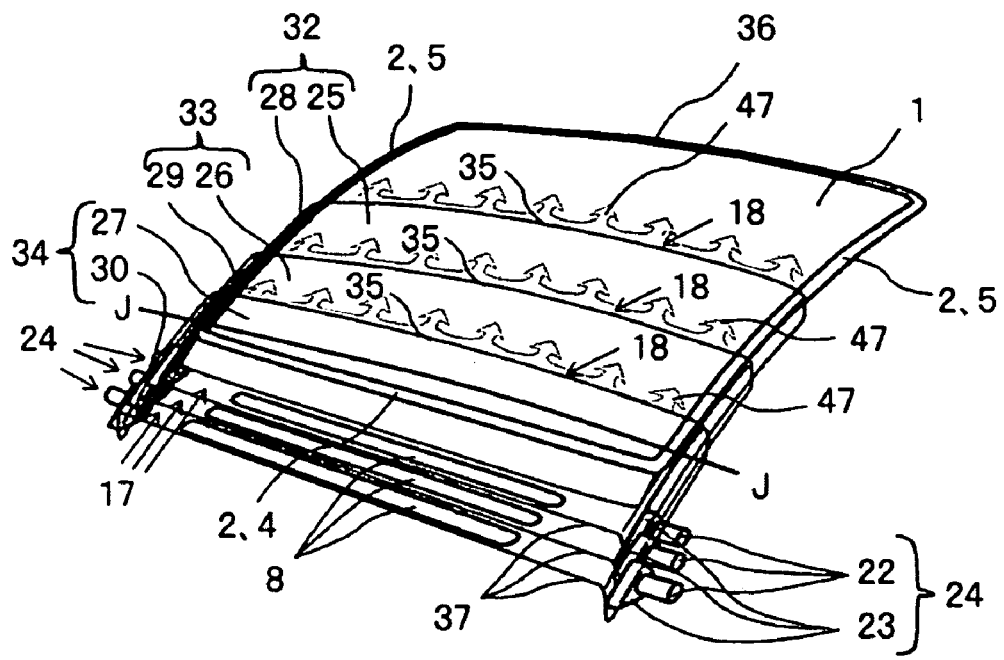
FIG. 12(a) Figure showing one example of the working mode of the present invention 7.
Figure 12B:
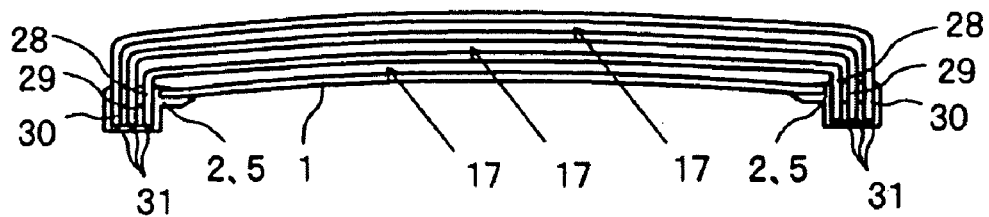
FIG. 12(b) Cross-sectional view along the JJ line in FIG. 12/1 of the present invention 7.
Figure 13A:
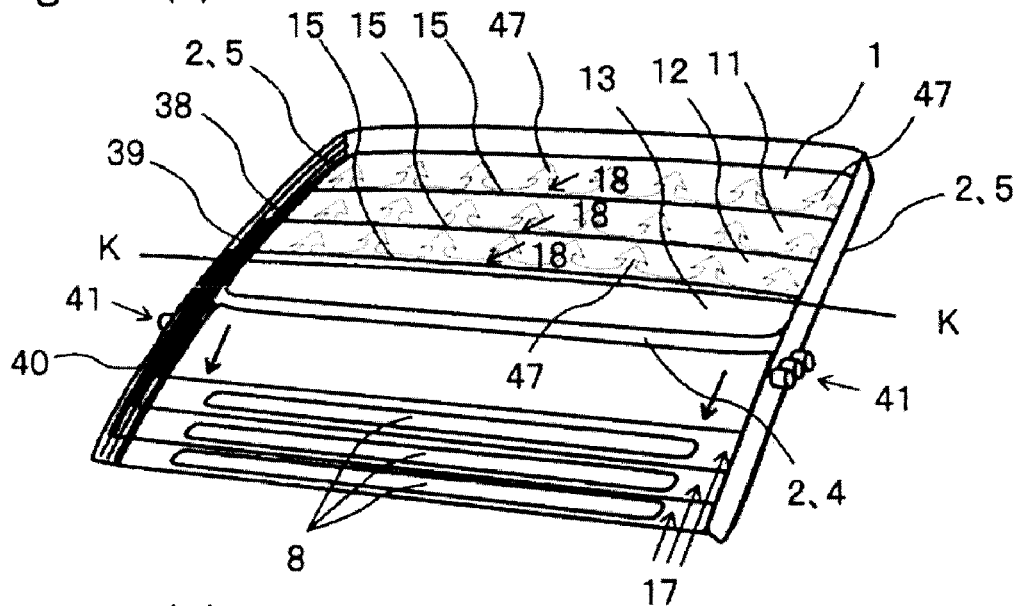
FIG. 13(a) Figure showing one example of the working mode of the present invention 8.
Figure 13B:
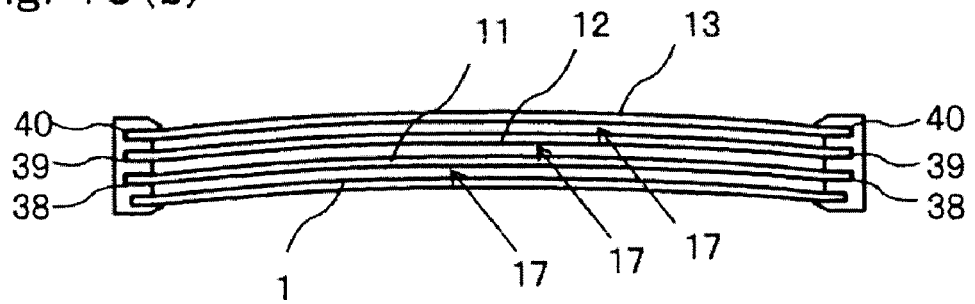
FIG. 13(b) Cross-sectional view along the KK line in FIG. 13/1 of the present invention 8.
Figure 13C:
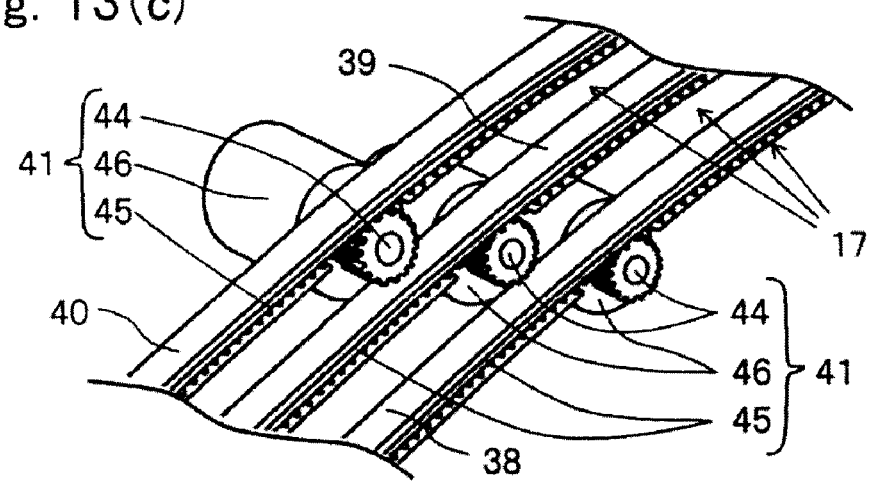
FIG. 13(c) Exploded sectional view of FIG. 13/2 of the present invention 8.
Figure 14A:
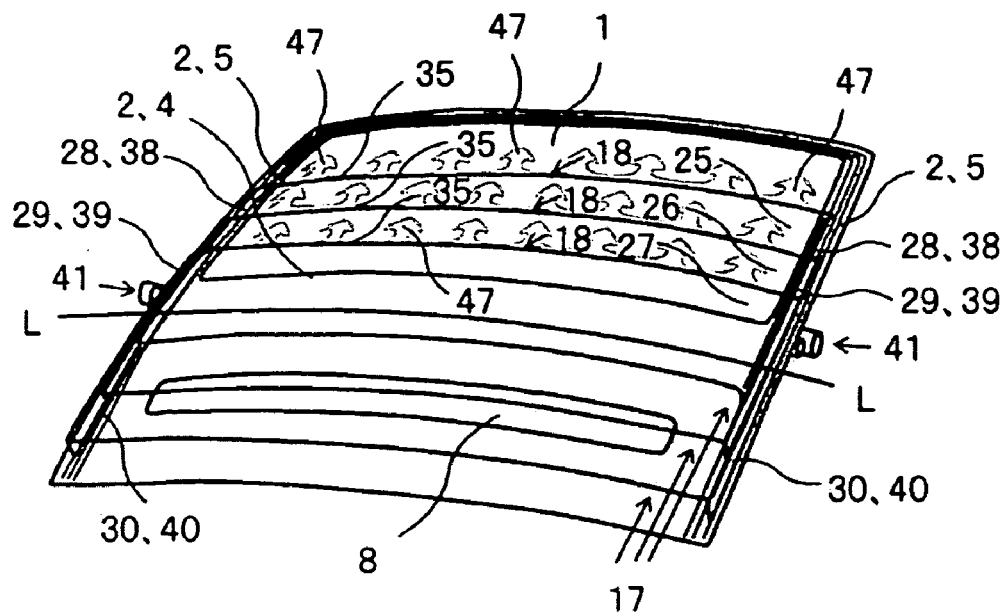
FIG. 14(a) Figure showing one example of the working mode of the present invention 9.
Figure 14B:
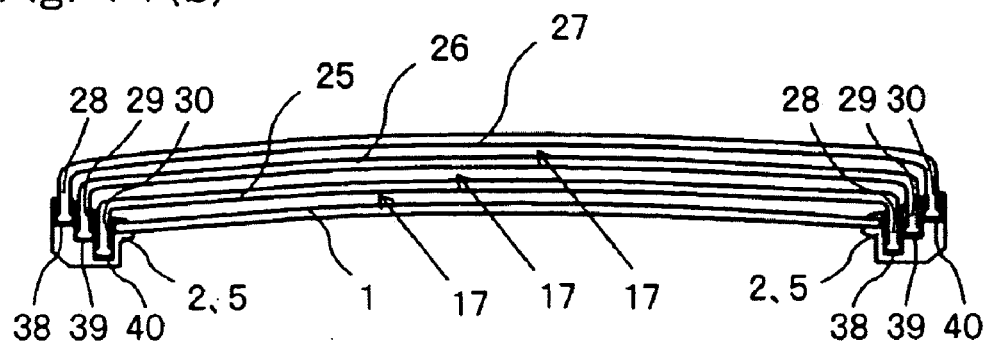
FIG. 14(b) Cross-sectional view along the LL line in FIG. 14/1 of the present invention 9.
Figure 15A:
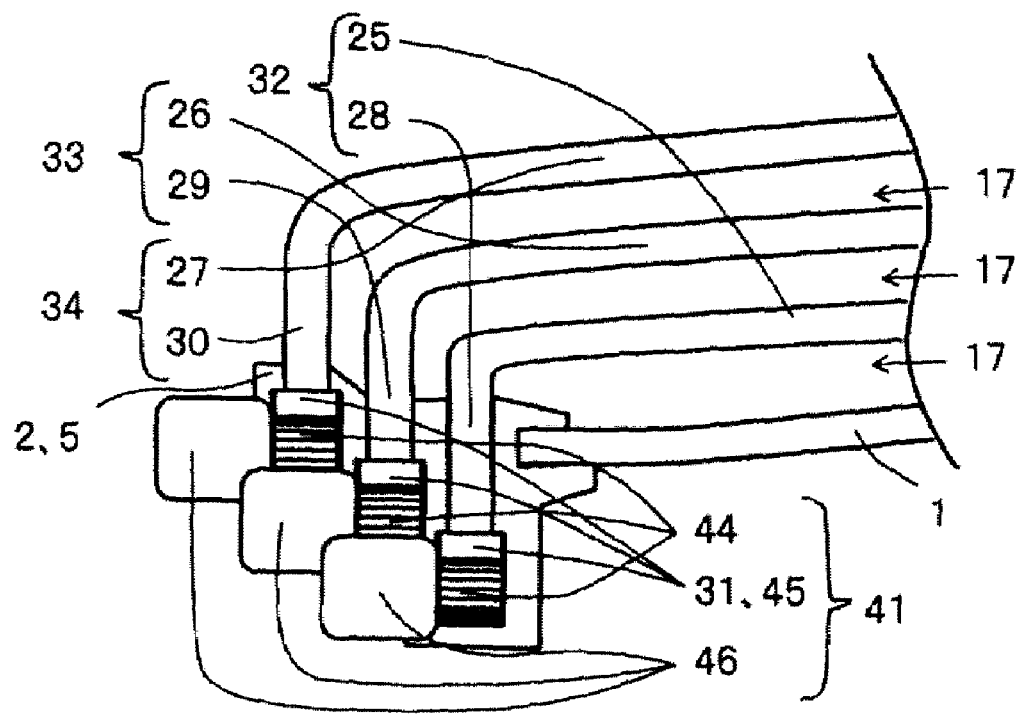
FIG. 15(a) Exploded sectional view of the sliding device in one example of the working mode of the present invention 9.
Figure 15B:
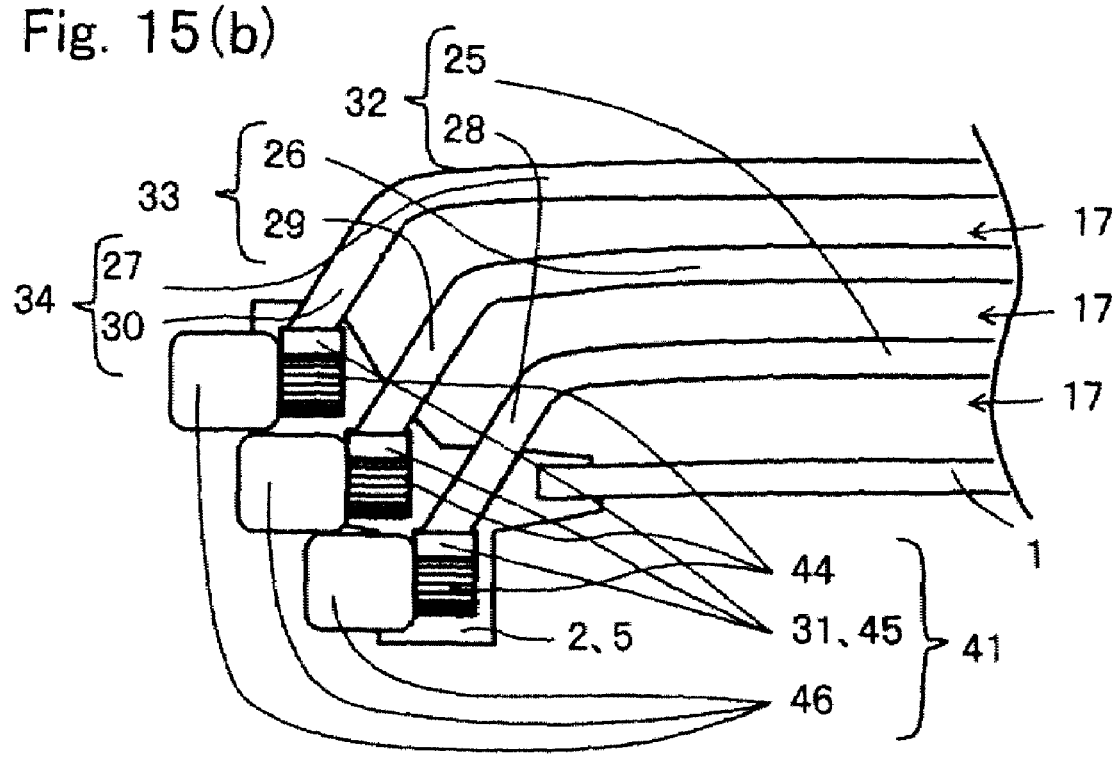
FIG. 15(b) Exploded sectional view of the sliding device in one example of a different mode of the present invention 9.

1 Lighting material
2 Window frame
3 Top edge section of window frame 2
4 Bottom edge section of window frame 2
5 Side section of window frame 2
6 Rain protection opening section
7 Line of sight of driver
8 Air jet nozzle
9 Edge on one side
10 Other edge
11 Rain protection plate
12 Rain protection plate
13 Rain protection plate
14 Side edge of rain protection plate
15 Leading edge of rain protection plate
17 Space
18 Rain protection slit
19 Frame member
20 Wind protection plate
21 Moving device
22 Shaft
23 Bearing
24 Tilting device
25 Transparent plate
26 Transparent plate
27 Transparent plate
28 Leg section
29 Leg section
30 Leg section
31 End of leg section
32 Rain protection member
33 Rain protection member
34 Rain protection member
35 Leading edge of rain protection member
36 Top edge of rain protection member
37 Bottom edge of rain protection member
38 Grooved frame
39 Grooved frame
40 Grooved frame
41 Sliding device
42 Guide section
43 Sliding member
44 Gear
45 Rack gear
46 Motor
47 Air
48 Motor cylinder
49 Support rod

What is claimed is:

1. A rain and snow protection device for the outside of a window in a motor vehicle, ship or aircraft, said window having a window frame with a top edge section, a bottom edge section, and side sections, and transparent window material within said window frame, said rain and snow protection device comprising:

a first transparent rain protection plate, said first transparent rain protection plate being disposed over said transparent window material and extending from one of said top edge section and said bottom edge section of said window frame to cover a portion of said transparent window material, thereby defining a first space therebetween, said first transparent rain protection plate having a leading edge extending across said transparent window material, said leading edge being separated from said transparent window material, thereby forming a first rain protection slit, said first transparent rain protection plate further having side edges, said side edges being connected to said side sections of said window frame; and a first air jet nozzle, said first air jet nozzle being disposed between said transparent window material and said first transparent rain protection plate, said first air jet nozzle being provided to blow air into said first space between said transparent window material and said first transparent rain protection plate and out through said first rain protection slit to remove water from said transparent window material.

2. A rain and snow protection device as claimed in claim 1 further comprising:

a second transparent rain protection plate being disposed over said first transparent rain protection plate and extending from one of said top edge section and said bottom edge section of said window frame to cover a portion of said first transparent rain protection plate, thereby defining a second space therebetween, said second transparent rain protection plate having a leading edge extending across said first transparent rain protection plate, said leading edge being separated from said first transparent rain protection plate, thereby forming a second rain protection slit, said second transparent rain protection plate further having side edges, said side edges being connected to said side sections of said window frame; and a second air jet nozzle, said second air jet nozzle being disposed between said first transparent rain protection plate and said second transparent rain protection plate, said second air jet nozzle being provided to blow air into said second space between said first transparent rain protection plate and said second transparent rain protection plate and out through said second rain protection slit to remove water from said first transparent rain protection plate.

3. A rain and snow protection device as claimed in claim 2 further comprising:

a third transparent rain protection plate, said third transparent rain protection plate being disposed over said second transparent rain protection plate and extending from one of said top edge section and said bottom edge section of said window frame to cover a portion of said second transparent rain protection plate, thereby defining a third space therebetween, said third transparent rain protection plate having a leading edge extending across said second transparent rain protection plate, said leading edge being separated from said second transparent rain protection plate, thereby forming a third rain protection slit, said third transparent rain protection plate further having side edges, said side edges being connected to said side sections of said window frame; and a third air jet nozzle, said third air jet nozzle being disposed between said second transparent rain protection plate and said third transparent rain protection plate, said third air jet nozzle being provided to blow air into said third space between said second transparent rain protection plate and said third transparent rain protection plate and out through said third rain protection slit to remove water from said second transparent rain protection plate.

4. A rain and snow protection device for the outside of a window in a motor vehicle, ship or aircraft, said window having a window frame with a top edge section, a bottom edge section and side sections, and transparent window material within said window frame, wherein said side sections each have a first lengthwise groove, said rain and snow protection device comprising:

a first transparent rain protection plate, said first transparent rain protection plate being disposed over said transparent window material and extending from one of said top edge section and said bottom edge section of said window frame to cover a portion of said transparent window material, thereby defining a first space therebetween, said first transparent rain protection plate having a leading edge extending across said transparent window material, said leading edge being separated from said transparent window material thereby forming a first rain protection slit, said first transparent rain protection plate further having side edges, said side edges being disposed in said first lengthwise grooves of said side sections;

a pair of first sliding devices one being operatively connected to each side edge of said first transparent rain protection plate for sliding said first transparent rain protection plate within said first lengthwise grooves; and a first air jet nozzle, said first air jet nozzle being disposed between said transparent window material and said first transparent rain protection plate, said first air jet nozzle being provided to blow air into said first space between said transparent window material and said first transparent rain protection plate and out through said first rain protection slit to remove water from said transparent window material.

5. A rain and snow protection device as claimed in claim 4, wherein said side sections of said window frame each have a second lengthwise groove, said rain and snow protection device further comprising:

a second transparent rain protection plate, said second transparent rain protection plate being disposed over said first transparent rain protection plate and extending from one of said top edge section and said bottom edge section of said window frame to cover a portion of said first transparent rain protection plate, thereby defining a second space therebetween, said second transparent rain protection plate having a leading edge extending across said first transparent rain protection plate, said leading edge being separated from said first transparent rain protection plate thereby forming a second rain protection slit, said second transparent rain protection plate further having side edges, said side edges being disposed in said second lengthwise grooves of said side sections;

a pair of second sliding devices, one being operatively connected to each side edge of said second transparent rain protection plate for sliding said second transparent rain protection plate within said second lengthwise grooves; and a second air jet nozzle, said second air jet nozzle being disposed between said first transparent rain protection plate and said second transparent rain protection plate, said second air jet nozzle being provided to blow air into said second space between said first transparent rain protection plate and said second transparent rain protection plate and out through said second rain protection slit to remove water from said first transparent rain protection plate.

6. A rain and snow protection device as claimed in claim 5, wherein said side sections of said window frame each have a third lengthwise groove, said rain and snow protection device further comprising:

a third transparent rain protection plate, said third transparent rain protection plate being disposed over said second transparent rain protection plate and extending from one of said top edge section and said bottom edge section of said window frame to cover a portion of said second transparent rain protection plate, thereby defining a third space therebetween, said third transparent rain protection plate having a leading edge extending across said second transparent rain protection plate, said leading edge being separated from said second transparent rain protection plate thereby forming a third rain protection slit, said third transparent rain protection plate further having side edges, said side edges being disposed in said third lengthwise grooves of said side sections;

a pair of third sliding devices, one being operatively connected to each side edge of said third transparent rain protection plate for sliding said third transparent rain protection plate within said third lengthwise grooves; and a third air jet nozzle, said third air jet nozzle being disposed between said second transparent rain protection plate and said third transparent rain protection plate, said third air jet nozzle being provided to blow air into said third space between said second transparent rain protection plate and said third transparent rain protection plate and out through said third rain protection slit to remove water from said second transparent rain protection plate.

* * * * *